July 9, 1963     O. H. BIGGS ETAL     3,096,568
MANUFACTURE OF LAMINATED CORE INDUCTORS
Original Filed Oct. 1, 1958     15 Sheets-Sheet 1
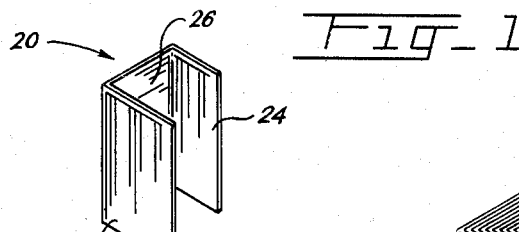
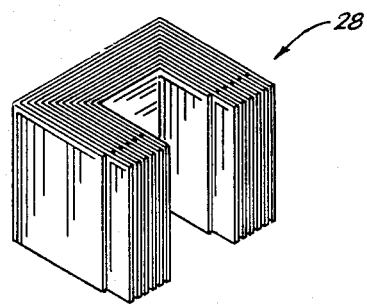
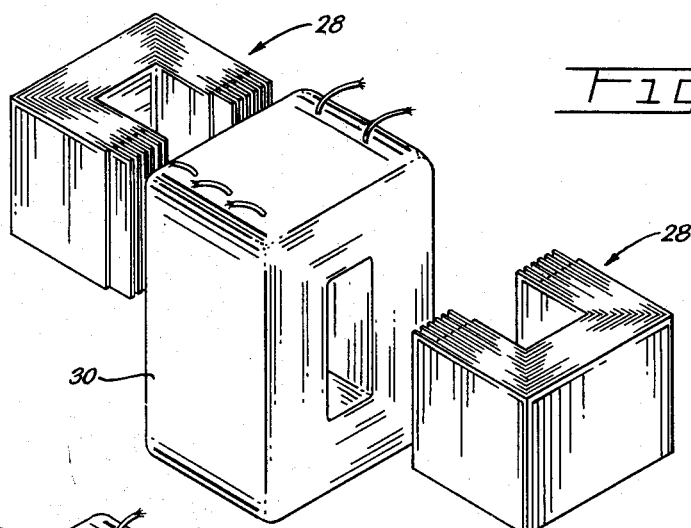
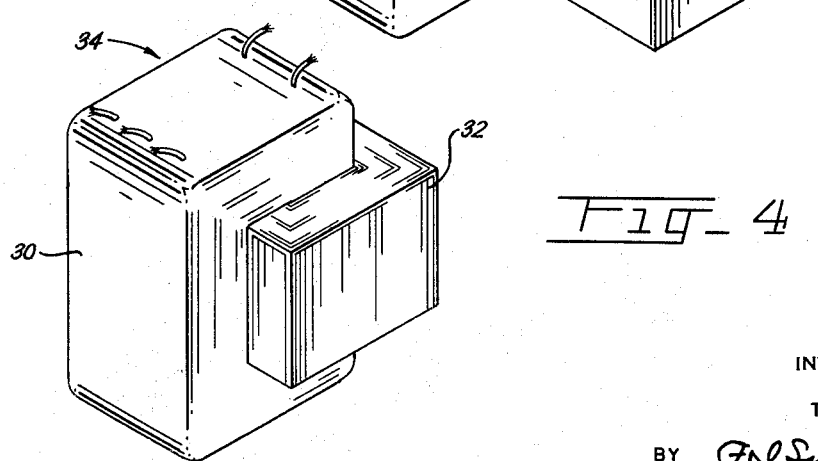
INVENTORS
O. H. BIGGS
T. WROBLEWSKI
D. R. DAYTON
BY
ATTORNEY

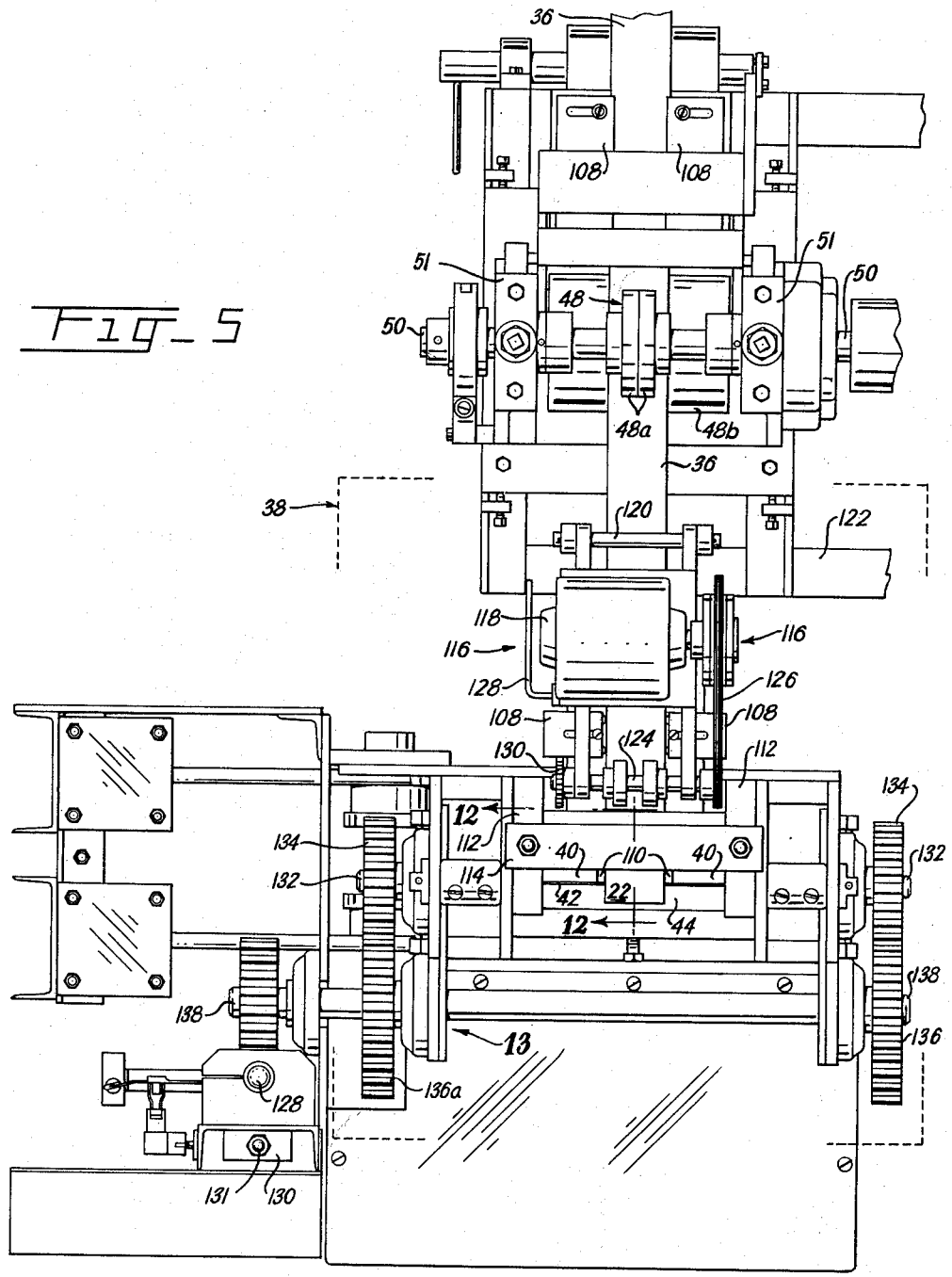

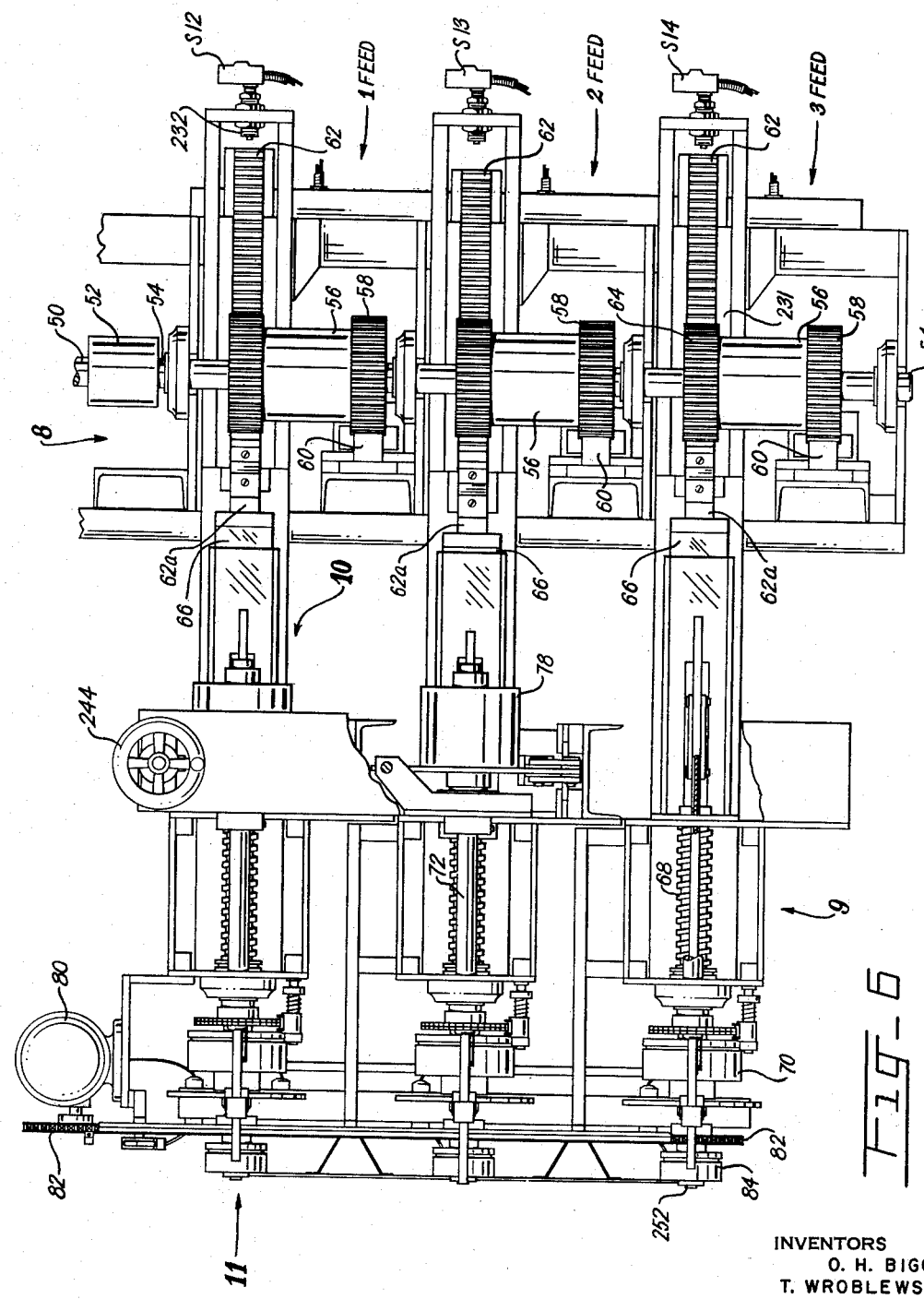

July 9, 1963 O. H. BIGGS ETAL 3,096,568
MANUFACTURE OF LAMINATED CORE INDUCTORS
Original Filed Oct. 1, 1958 15 Sheets-Sheet 7

Fig_10

INVENTORS
O. H. BIGGS
T. WROBLEWSKI
D. R. DAYTON
BY F. J. Sullivan
ATTORNEY

July 9, 1963     O. H. BIGGS ETAL     3,096,568
MANUFACTURE OF LAMINATED CORE INDUCTORS
Original Filed Oct. 1, 1958     15 Sheets-Sheet 8

Fig_11

INVENTORS
O. H. BIGGS
T. WROBLEWSKI
D. R. DAYTON
BY F. V. Sullivan
ATTORNEY

INVENTOR
O. H. BIGGS
T. WROBLEWSKI
D. R. DAYTON
BY F. V. Sullivan
ATTORNEY

July 9, 1963 O. H. BIGGS ETAL 3,096,568
MANUFACTURE OF LAMINATED CORE INDUCTORS
Original Filed Oct. 1, 1958 15 Sheets-Sheet 10
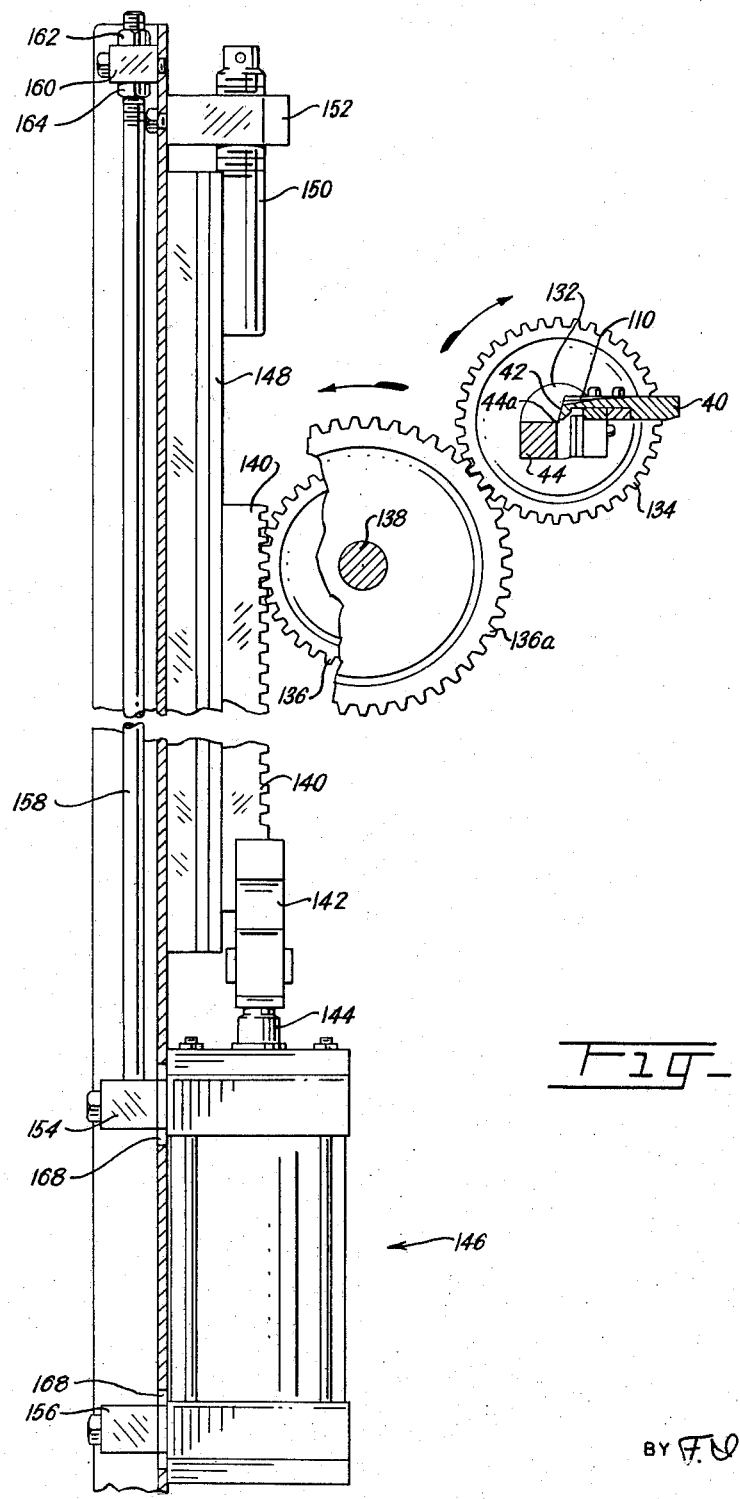
Fig_13
INVENTORS
O. H. BIGGS
T. WROBLEWSKI
D. R. DAYTON
BY F. V. Sullivan
ATTORNEY

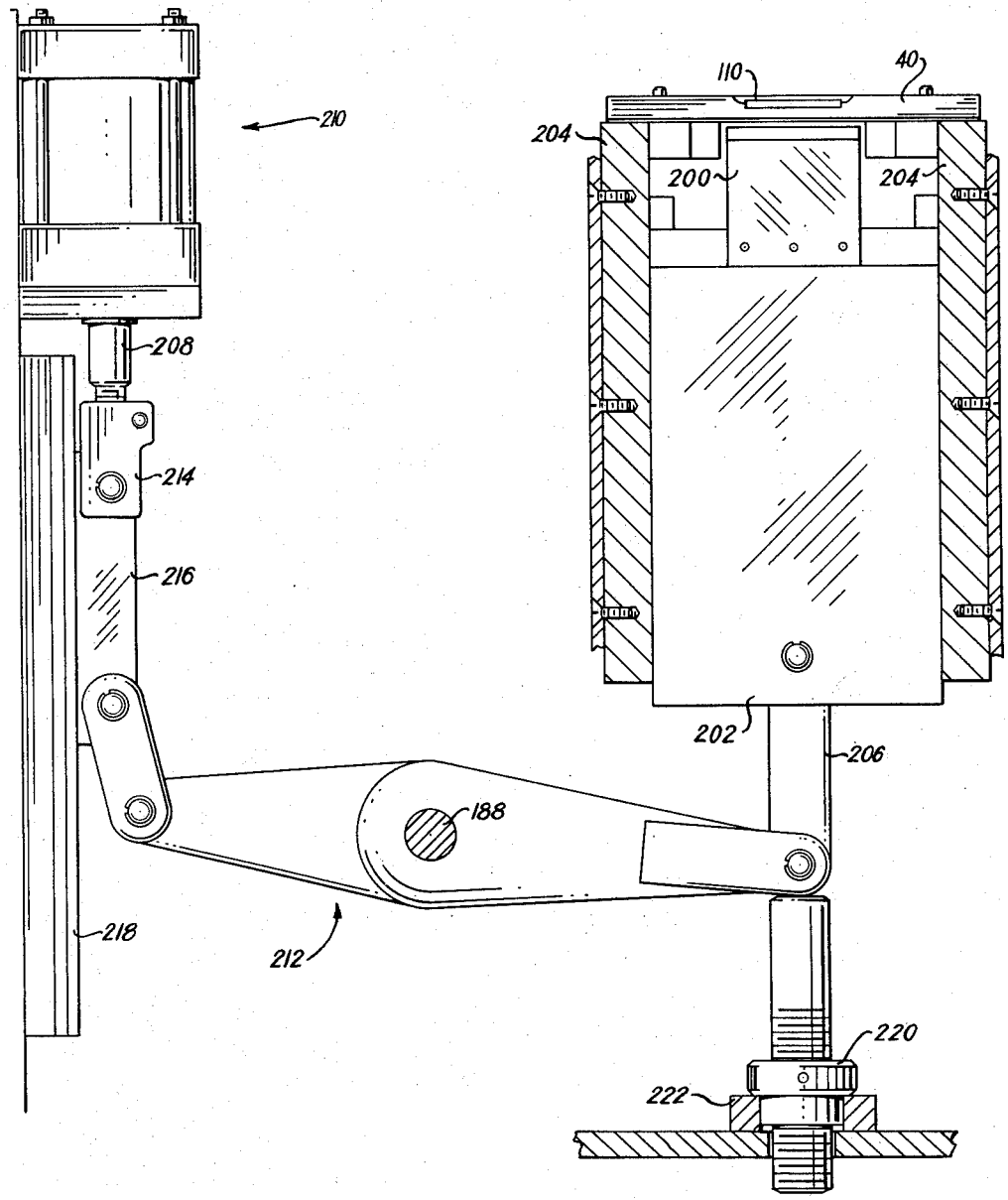

July 9, 1963
O. H. BIGGS ETAL
3,096,568
MANUFACTURE OF LAMINATED CORE INDUCTORS
Original Filed Oct. 1, 1958
15 Sheets-Sheet 12
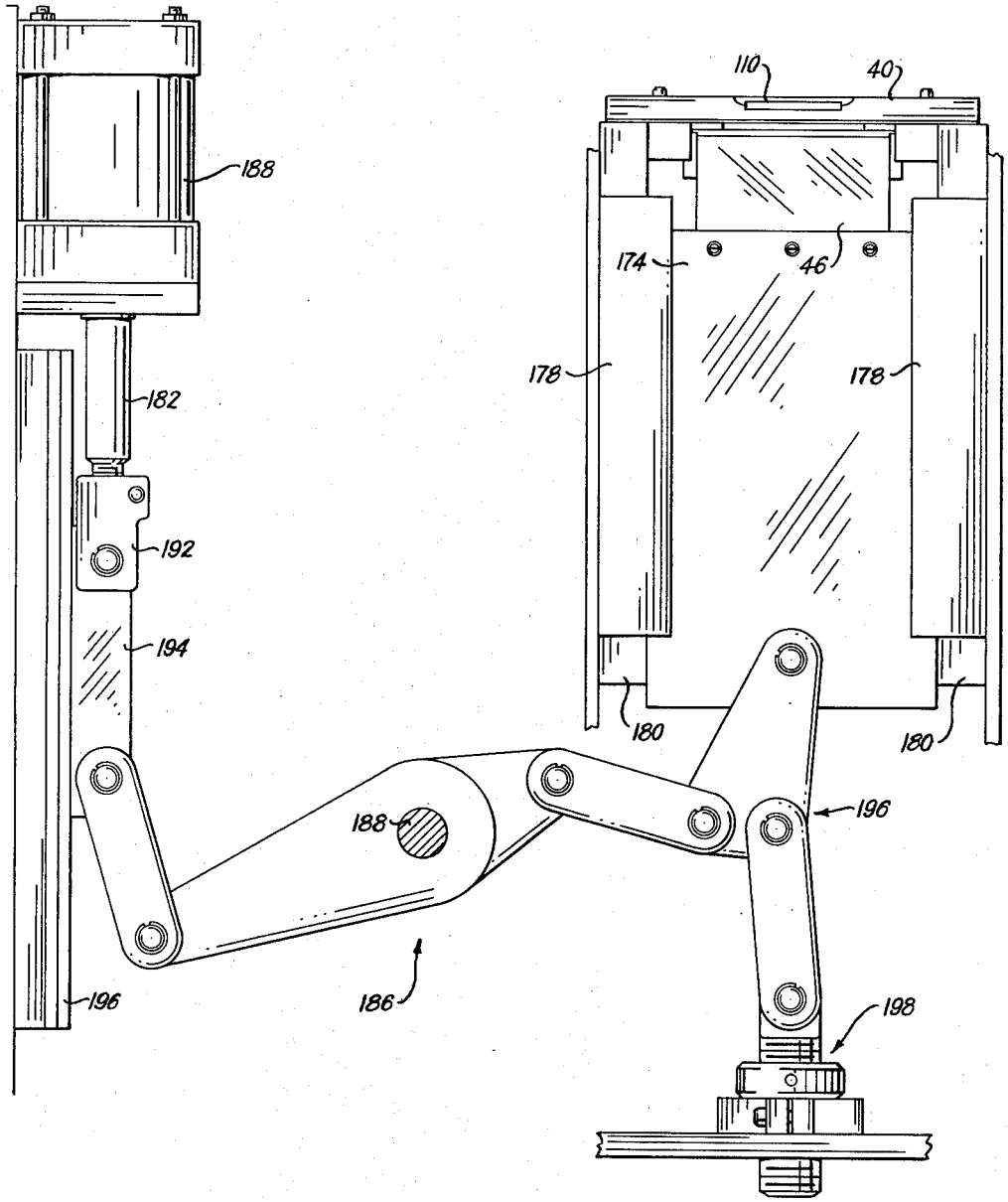
Fig_15
INVENTORS
O. H. BIGGS
T. WROBLEWSKI
D. R. DAYTON
BY F. H. Sullivan
ATTORNEY

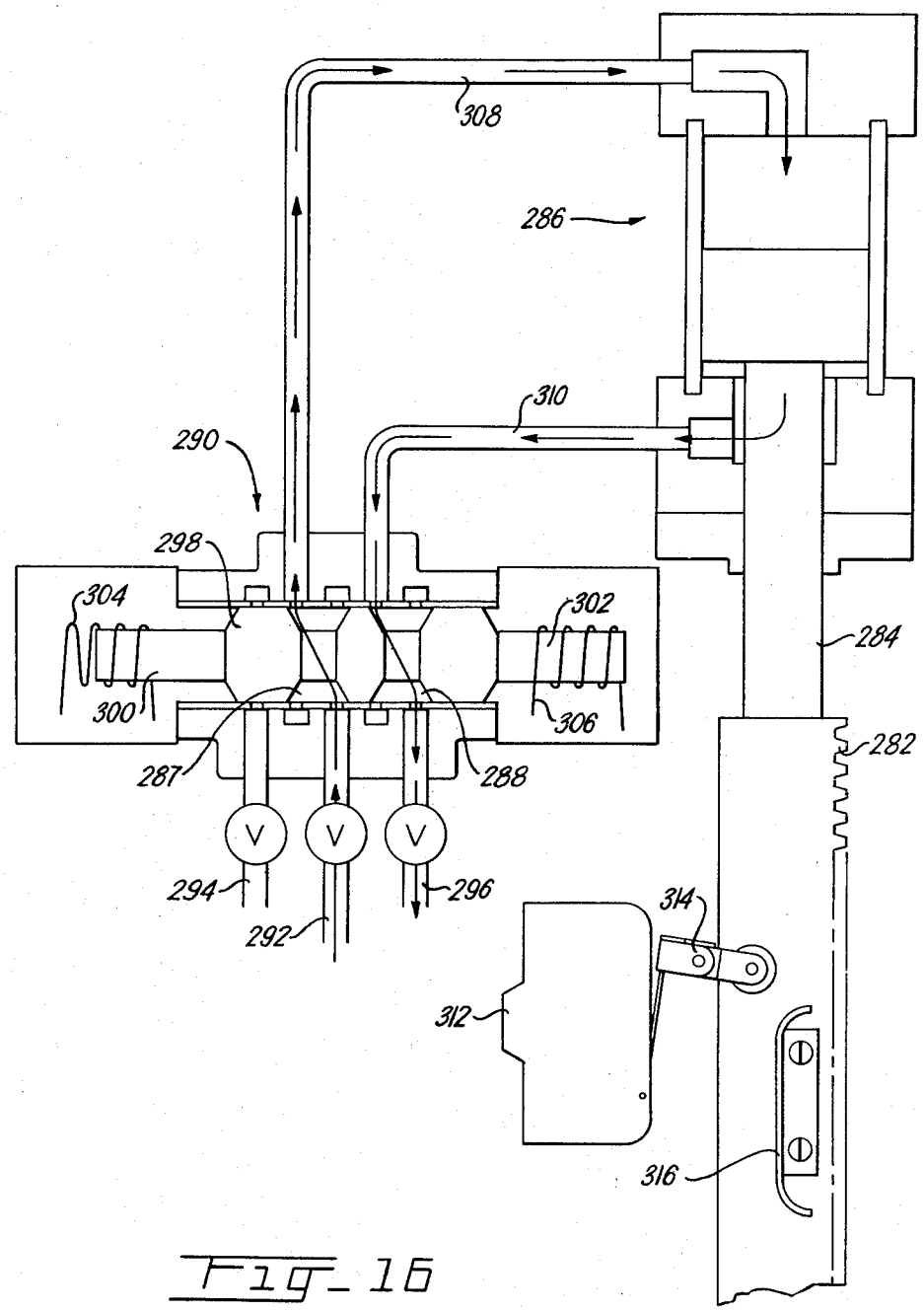

United States Patent Office 3,096,568
Patented July 9, 1963

3,096,568
MANUFACTURE OF LAMINATED CORE INDUCTORS
Orrick H. Biggs, Beverly, Theodore Wroblewski, Danvers, and David R. Dayton, Beverly, Mass., assignors to Sylvania Electric Products Inc., a corporation of Delaware
Original application Oct. 1, 1958, Ser. No. 764,588. Divided and this application Nov. 2, 1959, Ser. No. 858,003
7 Claims. (Cl. 29—155.61)

This invention is concerned with electromagnetic inductors of the laminated core type, and particularly with improvements in methods of manufacturing these inductors and machinery for fabricating their cores. The present application is a division of Ser. No. 764,588, filed October 1, 1958, in behalf of the same inventors.

Electromagnetic inductors, in the form of transformers or inductive reactors, are among the more generally used of electrical and electronic components; and their size, weight, and cost are critical factors in the design of systems and equipment.

The size and weight problem is due principally to the metal core which is used to provide a relatively low reluctance path for the electromagnetic field produced by the inductive coils. It has been the custom to alleviate this difficulty to some extent by resorting to a laminated core construction which avoids the eddy currents affecting the efficiency of a solid core and therefore requires less total mass to provide a given flux conductivity.

Laminated cores have generally been made in three types characterized by the configuration of their component laminations. The least expensive to manufacture is the E-configuration core which is assembled by stacking individual E-shaped stampings one upon the other to achieve the desired mass of metal. Preformed inductive windings are then placed around one or more legs of the E, and the magnetic circuit is completed by closing the open side with an I-shaped bar. Although this method of assembly has the merit of being relatively inexpensive, it demands a heavy premium in size and weight because of the inherent inefficiency resulting from the flat stamping of an E-shaped member having a different direction of metal grain, as far as magnetic flux is concerned, in its base leg than it has in its arms. This causes an uneven flux through the stamping with resulting design problems and necessity for extra mass to achieve a desired total flux conductivity.

A second type of transformer core is designated as the C-configuration. It is so-called because the individual laminations are in the shape of the letter C with flat top and bottom legs. A complete core is formed by butting two C laminations together, or closing the end of a C with an I member, after inductive windings have been placed around selected legs of the C or the I. The individual laminations of the C may comprise flat stampings, as referred to above in connection with the E-configuration, or they may be cut into lengths and bent to the C-configuration with a series of laminations stacked one around the other to form a core.

Cores of this latter type, i.e. the bent C, have been known in the art at least since the issue of British Patent 7,856 of 1889. They overcome the difficulties associated with the disparity of grain discussed with reference to the stamped E-laminations, but are difficult to fabricate and assemble because, in order to permit stacking, each side of each successive lamination within the stack must increase in dimension by an amount determined by the thickness of the stock material.

A third type of core is the so-called toroid which is formed from a continuous spiral of strip metal. This type has superior flux characteristics because of its continuous and unidirectional flux path but it is relatively expensive and difficult to fabricate, except for inductors whose windings have few turns.

The industry has long sought a manufacturing technique which would provide the flux efficiency of the toroid or bent C and yet be as amenable to manufacture as the stamped E- or C-configurations.

U.S. Patent No. 2,477,350 describes one method of providing a core of the bent C type which is fabricated by stacking an assembly of strips of magnetic material pre-cut to progressively varying lengths and then bending the entire assembly to the desired core configuration with the aid of a special jig and press combination. The resulting core would appear to enjoy relatively high flux conductivity, but the method of making it is difficult to practice and inherently limited for satisfactory operation to a relatively few number of laminations.

Another approach is shown in Acly Patent 1,935,426. Here, a basic toroid configuration is provided by winding a strip of core material around a form. The core is then cut in one or two places to permit it to be inserted through the center window or opening of a preformed winding and reassembled as a complete inductor. Again, there is relatively high flux conductivity but the disadvantage of at least partially destroying the effect of annealing the core material in the area of the cut so that this requirement of the magnetizing process must best be performed as a separate step for each core after cutting instead of in the more efficient manner as an adjunct of the rolling of the strip material. Also, the individual laminations of each core must be separated after the cutting process and individually inserted through the core by hand in an intricate pattern of alternate reversal of original position to provide an overlap at the joints to provide optimum flux and hold the assembly together.

These fabrication and assembly techniques are representative of the present state of the art and have resulted in manufacturers of transformers and other inductors in large quantity lots being for the most part forced to adopt the relatively inefficient E configuration as their commercial standard because it is the one best suited to economic production techniques and enables them to supply the product at a price the industry can afford.

This practice, however, has not been entirely satisfactory. As a practical necessity, the manufacturer has been forced to limit his product line to a number of specific sizes and ratings, and his selling price must carry the burden of inventory of the stamped laminations of all sizes that he or his supplier must have on hand to provide prompt response to orders. Also, the user must pay a premium for special design and construction; or else, accept the extra size, weight and cost of the relatively inefficient E-configuration. This burden is further aggravated because, as a practical matter, the only unit available from a stock line to satisfy a given requirement will most generally be one with a rating in excess of the specific need.

Another anomaly of the present state of the art of manufacturing laminated core inductors is that, within practical ranges of size, the cost of individual units goes up as size goes down because of the fabrication difficulties involved.

Accordingly, a principal objective of the present invention is to provide a method and machinery for the manufacture of laminated core inductors, such as transformers, reactors, etc., which will be less expensive from the viewpoint of dollar cost, as well as in weight and size, and more responsive to design requirements of special orders, than the techniques of the present state of the art.

Other objectives are to provide an improved method for manufacturing laminated core inductors and improved machinery for the fabrication of bent metal strips of progressive sizes suitable for the laminations of the cores of such inductors.

A more specific objective is to provide a manufacturing method and mechanism whereby laminated core inductors may be produced at a cost comparable to that of present E-configurations but with a flux efficiency comparable to the bent C and toroid types.

These and related objectives are accomplished in accordance with the present invention by a different approach to the problem of manufacturing cored inductors and fabricating the laminations which comprise their cores. This approach features feeding at a work station, from a source such as a roll of strip stock metal, a critical length of material for each dimension of each lamination. The strip is bent after each feeding operation to provide the desired configuration for the lamination and severed when the lamination has been completely formed. Also, the amount of material fed for corresponding dimensions of successive laminations is altered in increments measured by the thickness of the stock material so that successively formed laminations fit one to the other in a stack.

This manufacturing technique has the merit of making it possible to build up a core with any desired number of laminations instead of being limited to the capacity of the jig and press combination referred to previously. Also, the separate bending of the laminations makes possible a better fit of the laminations comprising the stack than when they are all bent together in a single operation and, consequently, a better flux characteristic. Moreover, the bending and cutting of the stock material in single thicknesses does not destroy the effect of previous annealing.

In one embodiment of the invention the separate prebent laminations are each of the bent C type with one arm of the C longer than the other. With this design, when alternate laminations in the stack are turned so that the short side of succeeding laminations will be first on one side of the stack and then on the other, the result is a serrated edge along the butt ends of the assembled C. This C comprises a half core. With two half cores made in similar fashion, it is possible to match complementary serrations and fit them together to form a complete core providing a continuous magnetic circuit. Before this matching of serrations takes place, however, the inductive windings of one or more coils, which have been preformed in a separate operation, are placed over whatever leg or legs of the serrated half cores is required by the design of the inductor. Consequently, when the half cores are matched together, the complete inductor combination of core and windings is provided.

The machinery which is used to fabricate the individual laminations of the core comprises: a work station through which strip stock of lamination material is fed; a bend brake to bend the stock to the configuration of each lamination; a cutter to sever the laminations from the stock material; a feeding mechanism which moves the stock material through the work station in independently controllable measured lengths for each bending or cutting operation; and, means for causing these measured lengths to differ in increments equal to the thickness of the stock for each corresponding dimension of successive laminations so that these will be adapted to fit into or around one another.

This cutting and bending mechanism has automatic and adjustable control of the dimensions of successive laminations, and makes it possible to fabricate automatically the laminations of bent C type cores which have superior flux conductivity and are adapted to be fitted to preformed windings with an economy of labor and time. The windings of one inductor can be assembled to its core while the laminations of the next core are being automatically formed; and, since both the size and number of laminations can be changed as a matter of simple machine adjustment, it is possible to provide the exact mass of core required for any set of specifications. Thus, optimum inductor design is provided with a minimum of difficulty, and the only inventory of core material or laminations required is rolls of strip stock.

Other embodiments, modifications, and objectives of the invention will be apparent from the following description of a method of manufacture and a mechanism which have given satisfactory performance in the production of cored inductors, and reference to the accompanying drawings, wherein:

FIG. 1 is a perspective view of a single lamination adapted to be assembled into the core of an electromagnetic inductor;

FIG. 2 is a similar perspective of an assembled stack of laminations forming a half core;

FIG. 3 is a perspective of two half cores and the preformed windings of an inductor arranged for assembly into an integral unit;

FIG. 4 is a perspective of an assembled inductor;

FIG. 5 is a plan view of the work station and feed control of a lamination forming machine;

FIG. 6 is a plan view of feed and increment measurement controls for the mechanism of FIG. 5;

FIG. 13 is a side elevation, partly in section, in the direction of arrow 13 in FIG. 5, of the bend brake operating mechanism;

FIG. 14 is a front elevation, partly in section, in the direction of arrow 14–15 in FIG. 5, of the clamp at the work station and its operating mechanism;

FIG. 15 is a front elevation, in the direction of arrow 14–15 of FIG. 5, of the cutter at the work station and its operating mechanism;

FIG. 16 is a diagrammatic representation of one of the operating racks of the machine along with its solenoid operated pneumatic prime mover and the switch contact by which it controls other operations in the machine;

METHOD OF ASSEMBLING A LAMINATED CORE AND INDUCTOR

Figure 7:
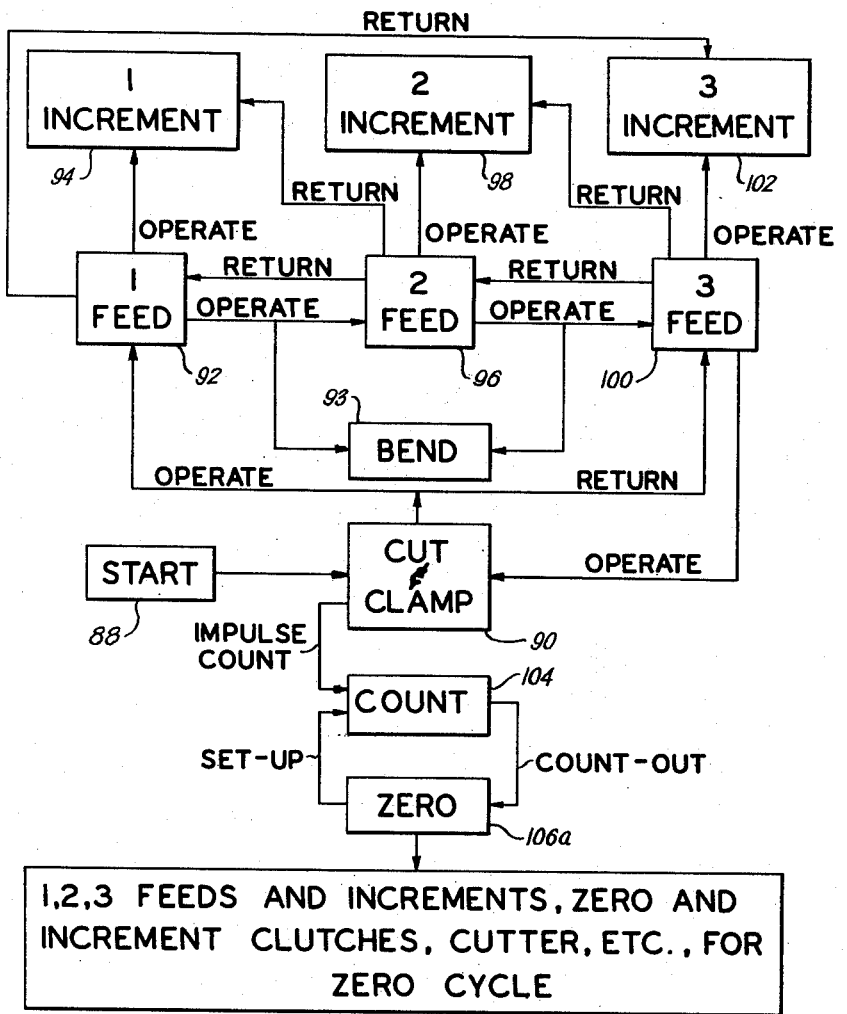
FIG. 7 is a functional block diagram of the mechanism of FIGS. 5 and 6.

FIGS. 1–4 show, in perspective view, the steps involved in assembling a laminated core and inductor, e.g. a transformer, after the manner of the invention.

Individual C-shaped laminations 20, each having a long arm 22, a short arm 24 and a base 26, are separately bent and cut from strip stock of magnetic material. The dimensions of the arms 22 and 24 and the base 26 are changed in successive increments or decrements equal to the thickness of the stock, for corresponding dimensions of successive laminations so that each succeeding one fits compactly around its predecessor to form a half core assembly 28. In effecting these changes the linear dimension of the base 26 of each lamination is altered by twice the thickness of the stock material and the linear dimension of each arm portion 22 and 24 is increased (or decreased) by an amount equal to a single thickness of the material so that the net effect of connecting two arms so extended, when two half cores are joined together, is to change the entire resulting structure by a linear dimension equal to twice the thickness of the stock material. Thus, when two half cores are so joined, the resulting four-sided laminations will fit one within the other in a nested stack.

During the stacking of the half core 28, alternate laminations 20 are turned so that the long sides 22 and the short sides 24 are staggered to provide a serrated edge along their butt ends, as shown in FIGS. 2 and 3. Then, a pre-formed inductive winding 30 is put into position around an arm 22 or 24 of a half core 28 and the serrations of this half core are matched to complementary serrations of another half core through the central opening or window of the winding 30 to provide a complete core 32 and transformer assembly 34.

PRINCIPAL PARTS AND GENERAL THEORY OF OPERATION OF LAMINATION FORMING MACHINE

FIGS. 5 and 6, in combination, show a plan view of a machine for fabricating separate C-shaped laminations 20, with size and base dimensions changing in controlled increments from one lamination to another.

Figure 12:
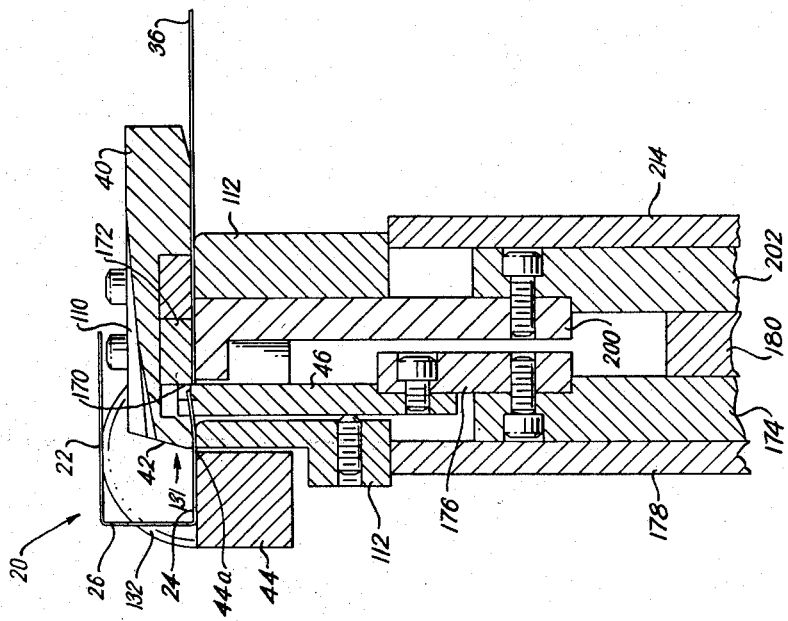
FIG. 12 is a sectional view, along the line 12—12 in FIG. 5, of the bending and cutting mechanism at the work station.

In FIG. 5 a strip 36 of stock material is shown feeding through a work station 38. At this station, it passes under a die plate 40 having a bend surface 42 against which the material 36 is bent by a bend brake 44 (see FIG. 12). A cutter 46 is also provided to sever the bent stock from the strip between laminations. This cutter underlies the die plate 40 and is shown in FIGS. 12 and 15, but not FIG. 5.

The length of sides 22 and 24 and base 26 of the laminations 20 is determined in each instance by the length of stock fed through the work station 38 and across the die plate 40, for each bending or severing operation. This length of feed is measured by the degree of turn imparted to a feed roll 48 by its control shaft 50 (see FIG. 5).

As shown in FIG. 6, feed control shaft 50 is connected via coupling 52 to a feed control shaft extension 54 which is adapted to be turned by any one of a plurality (three are shown) of clutches 56. There is a separate clutch for each dimension of the laminations, e.g. sides 22 and 24 and base 26; and, each clutch is driven through a gear 58 by a rack 60. The degree to which each clutch 56 will turn shaft 54 is controlled by the adjustable traverse of an increment control rack 62 driven by each clutch 56 through a gear 64. (See FIG. 8).

Figure 9:
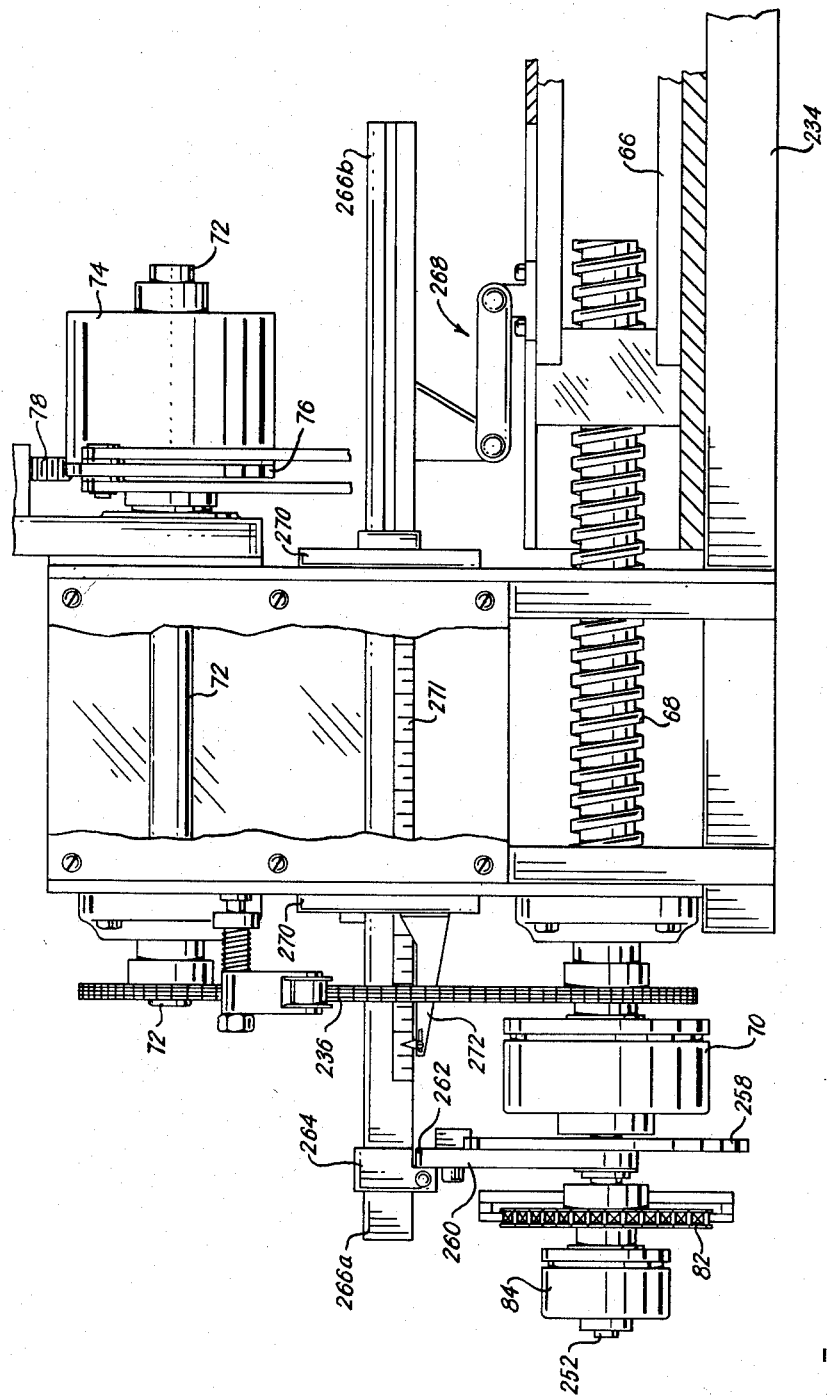
FIG. 9 is a side elevation in the direction of arrow 9 in FIG. 6 of an increment operating mechanism and the control for setting the length of the initial lamination.
Figure 10:
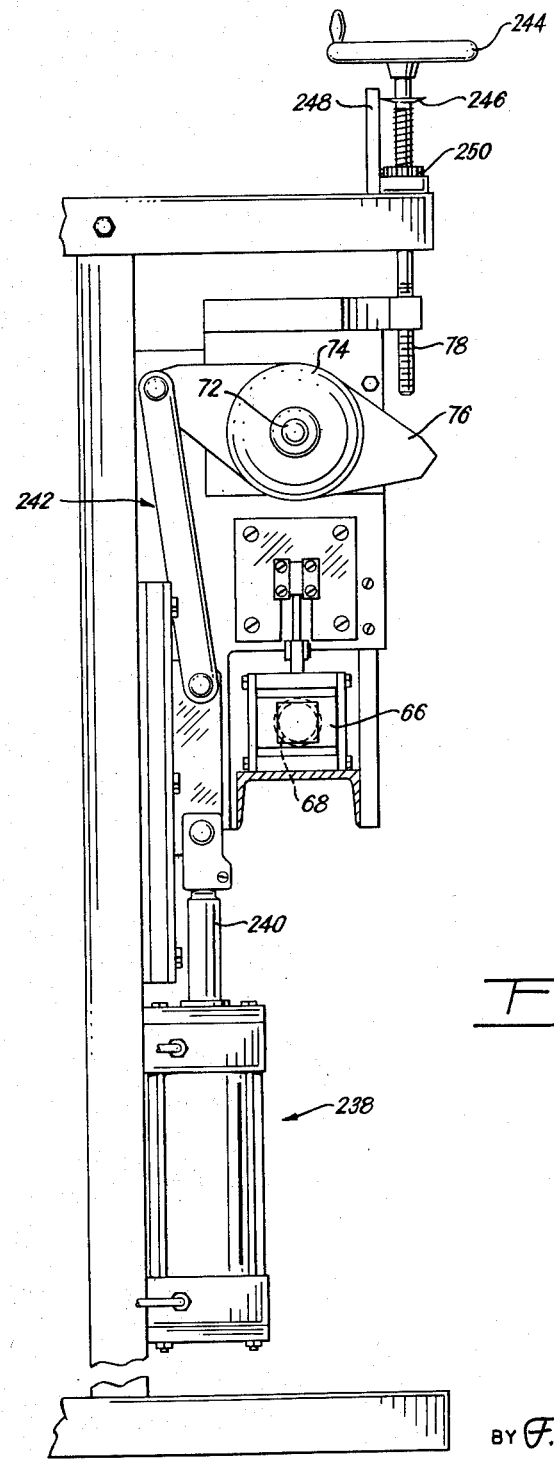
FIG. 10 is a rear elevation, in the direction of arrow 10 in FIG. 6, of an increment control mechanism.

The traverse of each increment control rack 62 is adjustably controlled by the position of a stop nut 66 movable upon a threaded increment adjustment shaft 68. Shaft 68, as shown in detail in FIGS. 9 and 10, is turned by a clutch 70 through chain drive connection to an increment control shaft 72 which is in turn driven by an increment clutch 74. This clutch 74 is moved (see FIG. 10) by a rocker 76 which has its stroke adjustably controlled to correspond to the thickness of the stock material 36 by an increment limiting screw 78.

A zeroing motor 80 driving a zero chain 82 and zero clutches 84 are also provided to turn shafts 68 in order to screw stops 66 to the proper initial setting at the start of the series of laminations which are to comprise a core.

Figure 17A:
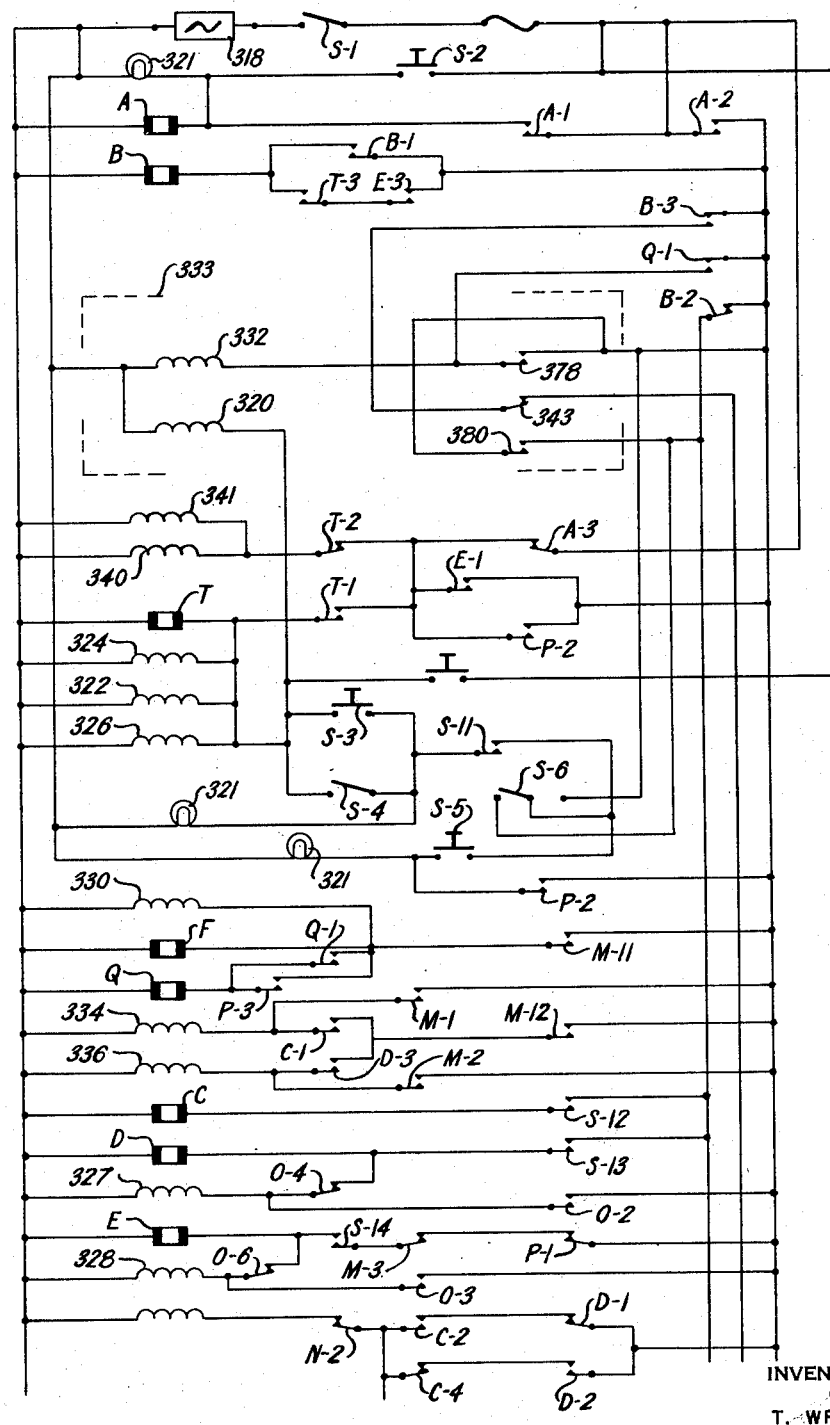
FIG. 17a is a schematic diagram of part of the control system of the machine; and, FIG. 17b is a similar schematic diagram of the remainder of the control system.
Figure 17B:
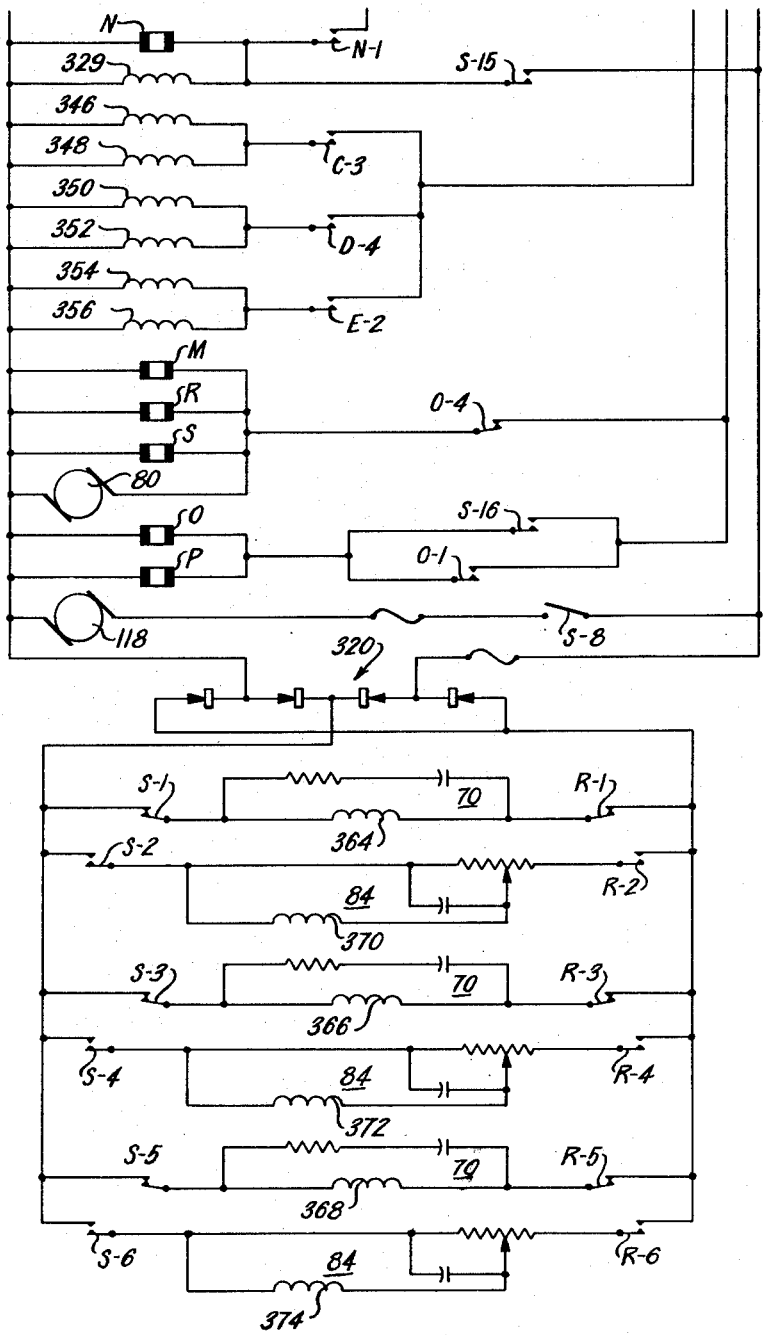

The prime movers for most of the mechanical motions of the machine are solenoid controlled pneumatic piston devices 86 (see FIG. 16) operated by a system of switches and relay controls shown schematically in FIGS. 17a and 17b.

The block diagram of FIG. 7 shows, in general outline, the manner in which this control system operates the machine to fabricate a three-sided lamination such as the C-shaped example shown in FIG. 1.

The starting operation 88 energizes the control system and initiates a cutting operation 90 to provide a reliably severed reference end of stock 36 to start the first lamination. Operation of the cutter also causes the #1 Feed 92 to measure the proper length of stock across die plate 40 at work station 38 for the first side, e.g. 22, of the lamination.

The #1 Feed, in turn, causes the bend operation 93 to bend the stock between the first side and the base 26. It also causes the #1 Increment Control 94 to move its rocker 76 and its associated increment control mechanism to adjust the position of its associated stop 66 and thereby provide for an incremental increase in the traverse of its rack 62 and a consequent increase in the degree of turn imparted to shaft 54 and in the length of stock measured out for the corresponding first side 22 of the next lamination.

Operation of the #1 Feed also initiates operation of the #2 Feed 96 which: measures out the stock material for the base 26 of the lamination; causes the bend brake 44 to make the bend between the base 26 and the other side 24; resets, i.e. returns, the prime movers of the #1 Feed and the #1 Increment Control to their original position, where they are then ready to start their next respective operations; operates the #2 Increment Control 98; and, initiates operation of the #3 Feed 100.

The #3 Feed, in turn: measures out the stock for the other side 24 of the lamination; operates the #3 Increment Control 102; returns the prime movers of the #2 Feed and #2 Increment Control; and, operates the cutter to sever the completed lamination from the strip stock and initiate the operating cycle for another lamination. The prime movers of the #3 Feed and #3 Increment Control are returned to operating position by the cutter and the #1 Feed, respectively.

In addition to severing the completed lamination and initiating the operating cycle for fabrication of another lamination, the cutter also controls the operation of the counter 104 which, upon achieving the full count of the desired number of laminations, starts the Zero Operations 106a and 106b, which cycle all of the operating mechanisms to their proper position to start another series of laminations for another core, and also resets the counter 104.

DETAILED DESCRIPTION OF PARTS

*Work Station.*—The work station 38 is shown in plan view in FIG. 5 and in section in FIG. 12. FIGS. 13, 14, and 15 are elevations of some of its component parts.

At this station, the strip of stock material 36 is fed across the under surface of a die plate 40 by feeding rollers 48 and associated mechanism which have been referred to above and will be described in more detail below. Guides 108 are provided to keep the stock material, which may be fed from a roll (not shown), central of the guide plate 40 and within the area of a clearance groove 110 in its upper surface. The plate 40 is secured to the frame 112 of the machine by a hold-down support or bracket 114.

A take-up device 116 is also provided at the work station. This device comprises: a motor 118 supported by a pivot 120 attached to a structural member 122 of the framework of the machine; a roller mechanism 124, constantly driven by the motor 118 through a drive belt or chain 126 to assert a steady tension on the strip of stock material 36 urging it away from the feeding rollers 48 and across the die plate 40; and, a lifting lever 128 by means of which the entire assembly 116 can be raised to provide clearance for starting the stock material 36 through the work station 38 during preliminary set up of the machine. Normally, the assembly 116 is held by a spring, not shown, or gravity so that the rollers 124 are constantly in resilient engagement with the stock material 36. A gear 130 comprises part of the driving mechanism for the roller system 124.

*Bend Braker.*—The bending mechanism is shown: in plan view, in FIG. 5; in section, in FIG. 12; and, in elevation, in FIG. 13. Its principal component is a bend brake 44 having a substantially square cross section and adapted to be turned upon an axis corresponding to its edge 44a and coinciding with the bottom edge of the forward or bending surface 42 of the die plate 40 (see FIG. 12). This turning action bends the stock material 36, which feeds through a throat 131 formed by the underside of plate 40 and a portion of the machine frame 112 adjacent the bend brake 44, over the bending edge 40a of die plate 40 and up against surface 42. FIG. 12 shows how a complete lamination 20 has been bent twice so that its first side 22 is turned back to overhang die plate 40. Clearance groove 110 is provided in case a dimension such as side 26 is so short that the bent-back side 22 will not clear the plate 40. As shown in FIG. 12, the three-sided lamination 20 has been bent after two successive feeding operations and then severed from strip 36 after a third feeding.

The bend brake 44 is mounted upon a shaft 132 which is coaxial with the bending line at the bottom of the bending surface 42 on die plate 40. This shaft 132 is attached at either end to gears 134 which are driven by jack shaft gears 136 attached to a jack shaft 138. One of these jack shaft gears, 136a, is in mesh with and driven by a rack 140 attached by a connector 142 to the piston 144 of a solenoid controlled pneumatic cylinder 146. The rack 140 is adapted to slide in a track 148 attached to the frame of the machine; and, an adjustable stop, in the form of a stud 150 threaded through a stop block 152 fixed to the track 148, is provided to limit its upward traverse. The limit of its downward traverse is determined by and adjustable setting of the cylinder 146.

Adjustment of this setting is accomplished with the aid of top and bottom cylinder support blocks 154 and 156 respectively. Top block 154 is fixed to a shaft 158 mounted parallel to the track 148. This shaft 158 is adjustable in a longitudinal direction by reason of its being threaded through a block 160, attached to the frame of the machine, and is held in adjustment by means of nuts 162 and 164 adapted to lock against block 160. Grooves 166 and 168 in the frame of track 148 provide clearance for blocks 154 and 156, respectively, thereby making it possible to raise and lower the cylinder 144 by threading shaft 158 up or down in block 160. This increases, or decreases, the traverse of rack 140, i.e. the distance, from the top of piston 144 to the stop 150, and thereby controls the degree of turn imparted through the gears 136 and 134 to bend shaft 132 and bend brake 44, an adjustment which is desirable to compensate for variation in the thickness of different stock materials 36.

*Cutter.*—The cutting mechanism is shown in section in FIG. 12, and in elevation in FIG. 15. Its shearing action is accomplished by bringing a blade 46 across the cutting edge 170 of an insert 172 in the die plate 40. This insert also has a clamping surface which will be referred to in more detail below.

The cutter blade 46 is adjustable against the cutting edge 170 by a set screw 173 through the frame 112 of the machine and is attached to a slide 174 by means of an adapter plate 176. Slide 174 is movable between guides 178 and a filler or spacer 180 by the piston 182 of a solenoid controlled air cylinder 184 operating through a system of levers 186 mounted on a pivot 188 and connected to the slide 174 by a toggle 190, and to this piston 182 through a connector 192 and a slide 194 mounted in a track 196 attached to the main frame of the machine.

An adjustment for the height of the cutting blade 46 is provided by a threaded stud and lock nut combination 198 connected to the bottom arm of the toggle 190.

*Clamp.*—The clamp 200 which holds the stock material 36 during the cutting operation is shown with its associated operating mechanism: in section, in FIG. 12; and, in elevation, in FIG. 14.

The clamping action is performed by forcing the clamp 200 against insert 172 in the top die plate 40. Clamp 200 is attached to a slide 202 mounted between the spacer 180 and a guide 204. Slide 202 is mounted on a link or stud 206 which is movable by the piston 208 of a solenoid-operated pneumatic cylinder 210 through a system of levers 212. This leverage is pivoted on the same shaft 188 as the lever system which operates the cutter, and is attached to piston 208 through a connector 214 and a slide 216 operating in a track 218. Adjustment of the height of the clamp 200 to provide for clearance of different thicknesses of stock is accomplished with a shouldered adjustment nut 220 threaded upon the end of stud 206 and engageable with a block 222 attached to the frame of the machine.

Figure 8:
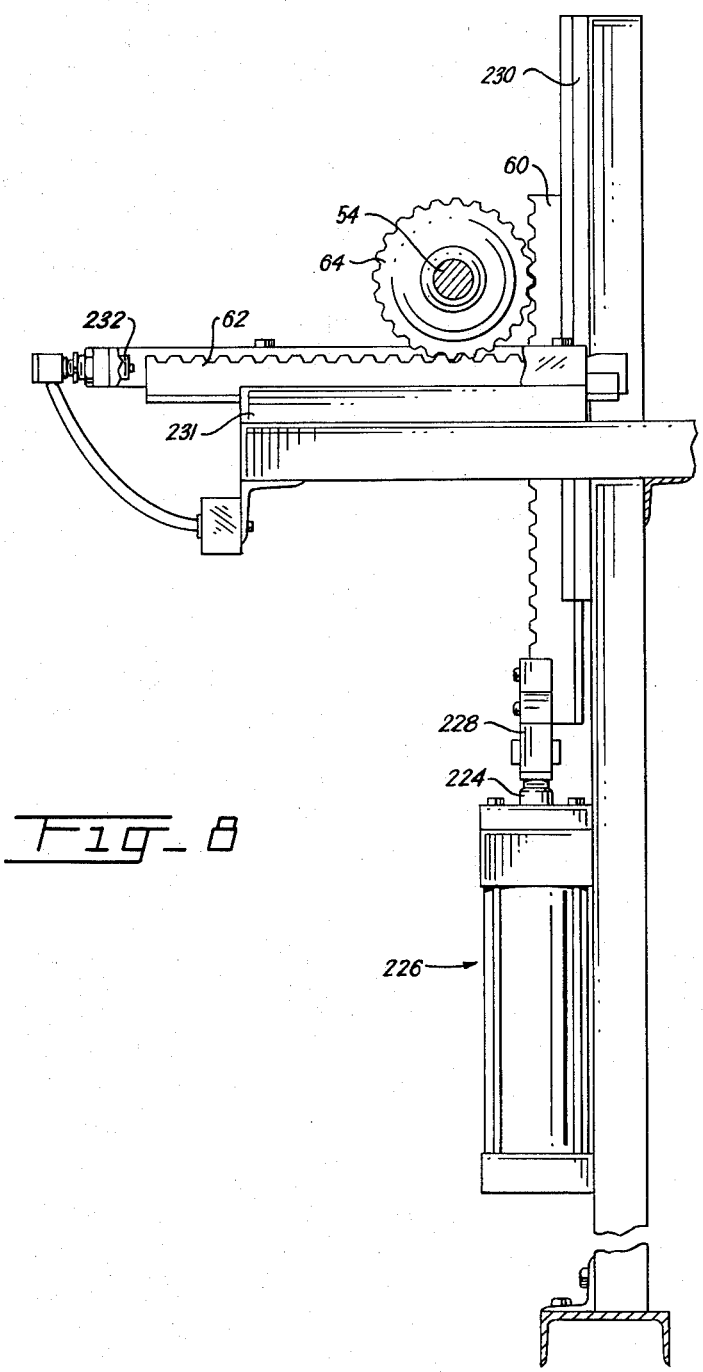
FIG. 8 is a side elevation, partly in section, in the direction of arrow 8 in FIG. 6, of one of the feed control mechanisms.

*Feed.*—The feeding mechanism is shown in plan view in FIGS. 5 and 6, and in elevation in FIG. 8.

As explained previously, and as shown in FIG. 5, the stock material from which the laminations are being formed is fed in a continuous strip 36 which is pulled by the feeding mechanism from a roller (not shown) on a stand in a convenient location proximate the machine. The dimension of each side of the lamination is determined by the length of stock which is fed across die plate 40 by the rollers 48 between successive bending or cutting operations.

The mechanism 48 which feeds the stock material includes, in the specific embodiment under description, a top split roller assembly 48a, and a bottom roller 48b. The split roller device 48a is employed to aid in keeping the stock material feeding in a straight line through the work station 38. The complete roller assembly is driven by an appropriate gear mechanism (not shown) connected to shaft 50 which is supported by pillar blocks 51. As has been explained, the degree of rotation imparted to the shaft 50 for each successive feeding operation determines the length of stock material measured across the die plate 40 for that operation and consequently the longitudinal dimension of the particular side of the lamination being formed.

For a three-sided lamination such as the one shown in FIG. 1, three feed controls and their associated mechanisms are used to provide an independent means for measuring each side of the lamination. In accordance with a programmed cycle controlled by the circuitry and associated mechanism shown in FIGS. 17a and 17b, each of these feed control mechanisms successively turns the shaft 54 and, therewith, shaft 50, to which it is joined by coupling 52, to impart a desired degree of rotation to the rollers 48 and a measured feed to the stock material.

As shown in FIG. 6, each feed comprises a gear 58 connected by a one way clutch 56 to the shaft 54 and operated by a rack 60. The rack is moved by the piston 224 of a solenoid controlled pneumatic cylinder 226, to which it is attached by a connector 228, and slides in a track 230 which forms a part of the general frame structure of the machine.

When the piston 224 pulls the rack 60 downward to the position shown in FIG. 8, the rack turns gear 58 in a clockwise direction imparting a similar turn to shafts 54 and 50. Shaft 50 thereupon, through a geared connection (not shown), reverses the clockwise motion and causes rollers 48 to feed stock material 36 across the die plate 40. On the return stroke, when piston 224 is forced from the cylinder 226 and the rack 60 is thereby pushed upward, the one way feature of clutch 56 enables the gear 58 to turn in a counterclockwise direction without imparting any of its motion to shaft 54 or feeding rollers 48. Thus, the mechanism is capable of feeding a length of stock material each time the rack 60 associated with any one of the three feeds accomplishes a downward stroke. The manner in which the length of material fed by this stroke is measured to a critical dimension, variable automatically for successive laminations, is explained in the following description of the increment control mechanism.

*Increment control.*—The increment control mechanism is shown in plan view in FIG. 6, and some of its parts in elevation in FIGS. 8–11.

Referring to FIG. 6, a separate increment control rack 62 for each of the three feeds is movable in forward and return traverses in a track 231 by a gear 64, which is turned in a clockwise or counterclockwise direction by the clutch 56 each time the feed operating rack 60 makes a downward or upward stroke, respectively. The limits of the forward and reverse traverses of rack 62 are defined by a rear stop 232 and an adjustable front stop comprised by the nut 66 on threaded increment adjustment shaft 68. A buffer 62a protects the end of rack 62 where it contacts the stop nut 66.

On its downward or feeding stroke, rack 60 turns clutch 56 and gear 64 in a clockwise direction. This moves rack 62 toward stop 252 and the stroke ends when the rack hits the stop. On the return or upward stroke of rack 60, since clutch 56 is connected to shaft 54 only for driving in a clockwise direction, shaft 54 and its associated feeding mechanism are stationary; but, gear 58, through clutch 56, turns gear 64 to move rack 62 until buffer 62a strikes the adjustable stop nut 66.

In this manner, gear 58 is operated by rack 60 to turn shaft 54 and feed stock material 36 for a number of degrees of rotation of shaft 54, and consequently a length of stock material, which is measured by the traverse of rack 62 from contact with the adjustable location of stop nut 66 to contact with fixed stop 232. An explanation of how the location of stop nut 66 on the increment control shaft 68 is adjusted between feed strokes in order to change the length of this traverse, and consequently the dimensions of each side of successive laminations follows.

In FIG. 9 a portion of the adjustable stop nut 66 is shown in a side elevation, along with its associated increment control shaft 68 and the mechanism whereby the shaft 68 is turned so that its threads move the nut 66 forward or backward in a track 234 attached to the structural framework of the machine.

The shaft 68 is turned in measured increments by a clutch 70 connected, through a main chain 236 and an appropriate sprocket mechanism to an increment control shaft 72. The extent to which this shaft 72, and consequently shaft 68, is turned for each incremental adjustment is determined by the degree of rotation imparted to increment clutch 74 by increment control rocker 76 which is operated by a solenoid controlled pneumatic cylinder 238 having its piston 240 connected through suitable linkage 242 to one end of the rocker.

When the solenoid 238 withdraws its piston 240 to pull rocker 76 and impart a counterclockwise motion to clutch 74 and shaft 72, shaft 68 is similarly turned by belt 236 and clutch 70 to move the nut 66. The amount of turn imparted is determined by the position of increment limiting screw 78 in the path of movement of rocker 76. This limiting screw may be turned by a handle 244 to set it to the desired position relative to rocker 76. The proper setting is determined by referencing pointer 246 against a scale on upright 248. This setting is maintained by a serrated collar and spring loaded detent combination 250. The incremental increase to which the limiting screw 78 is set is generally that which will permit rocker 76 to move through an arc sufficient to impart to shaft 68 sufficient turn to move stop nut 66 a distance calculated to permit rack 62 an increase in traverse sufficient to enable rack 60 to turn shaft 54 and feed rollers 48 an increased distance through an arc which will increase the length of stock material fed since the last operation controlled by this particular feeding mechanism by a distance corresponding to the thickness of the stock material used.

On the upward stroke of piston 240 and corresponding clockwise thrust of rocker 76, clutch 74 is adapted to rotate free on shaft 72 so that no motion is imparted to shaft 68.

*Zero setting.*—As explained above, each of the three feed mechanisms shown control the dimension of a separate one of the three-sided laminations shown in FIGS. 1–3. In order to accomplish the proper initial setting of the adjustable stop nuts 66 of each control mechanism so that the first lamination of each series comprising a separate core will have the proper dimensions, a zeroing operation is performed. The mechanism for accomplishing this is located at the front of the machine. It is shown in plan view in FIG. 6 and in side and front elevations respectively in FIGS. 9 and 11.

Figure 11:
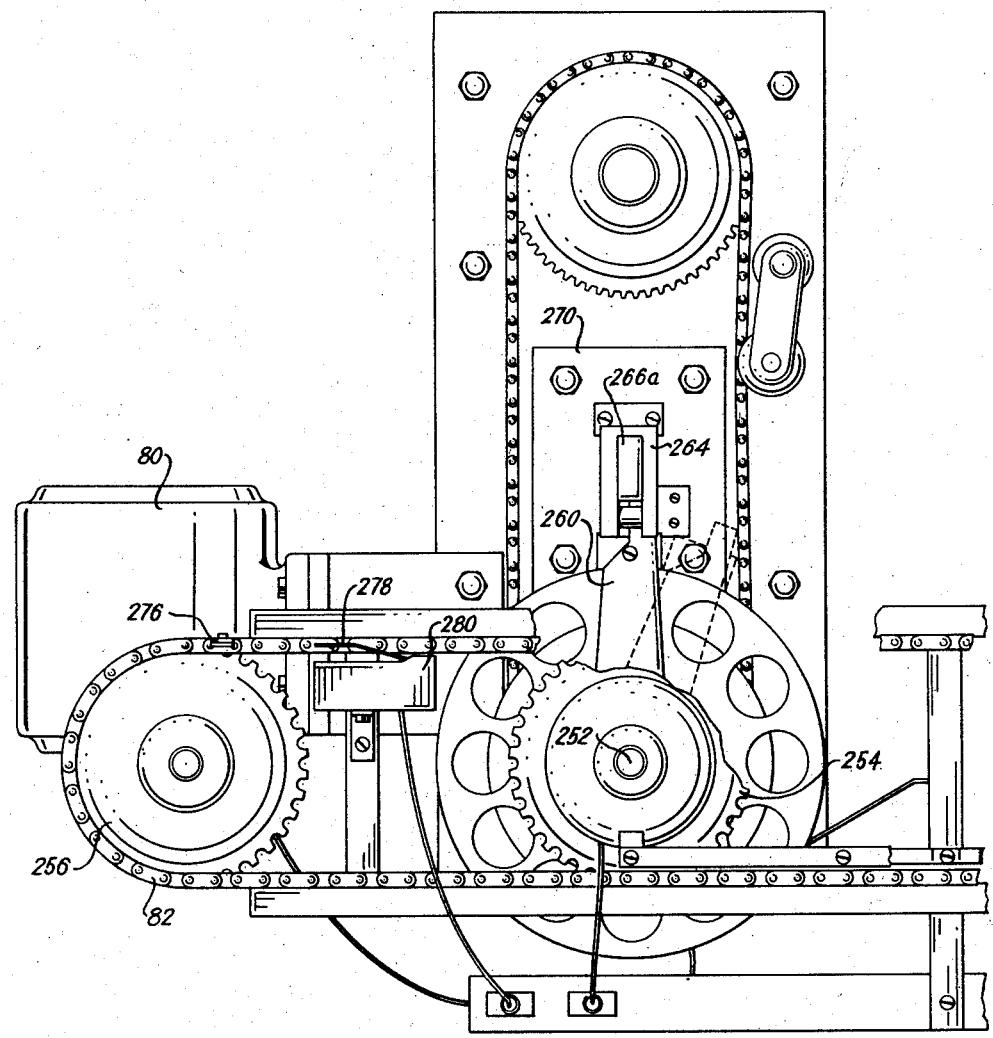
FIG. 11 is a front elevation, in the direction of the arrow 11 in FIG. 6, of an increment control mechanism.

The zero settings are achieved by turning shaft 68 in a counterclockwise direction, as viewed in FIG. 11, to move the respective stop nuts 66 along shaft 68 and push each forward to the proper setting for the smallest desired dimension for the side which it controls.

As a preliminary requirement of this zeroing operation, clutch 70 is disengaged from shaft 68 so that the turning of the shaft to achieve zero setting will not affect the increment control mechanism. This is accomplished, in the machine under description, by providing that clutch 70 be electrically controlled so that it can be disconnected from shaft 68 when desired by appropriate electrical signals from the programmed control system.

Zeroing is effected by rotating a shaft 252 connected as an extension to the increment control shaft 68 until the stop nuts 66 are in zero position. Each shaft 252 has a clutch 84 with a sprocket 254 connected by a chain 82 to a sprocket 256 on zeroing motor 80 which is thus enabled to turn these shafts. Also connected to each shaft 252 is an increment plate 258 having a stop arm 260 with a stop abutment area 262. The area 262 is engageable with a slidable stop 264 carried by a slide 266 connected by a linkage 268 to the stop nut 66. Suitable fittings 270 attached to the framework of the machine are provided so that the slide may move forward and backward as the stop nut 66 is adjustably positioned.

Slide 266 is divided into a front portion 266a, which carries the slidable stop 264, and a rear portion 266b which is attached to the stop nut 66. The stop 264 may be movable along slide 266, or the two portions 266a and 266b may be slidably fitted to one another so that the overall slide is expandable. By either technique, the point of contact between abutment 262 and stop 264 can be controlled to correspond with the location of stop nut 66 desired for the initial dimension of the first lamination. This setting can be facilitated by referencing a scale 271 on the slide 266 against a pointer 272 mounted on the framework of the machine. For this purpose, scale 271 may be calibrated in dimensions corresponding to those in which the different sides of the laminations are measured.

This machine works within very precise tolerances to measure the various dimensions of the laminations with exactitude. Therefore, in order that the engagement of abutment surface 262 with stop 264 may be set to a location determined by degrees of turn of the shaft 68 instead of full turns, the arm 260 is made adjustable radially of the increment plate 258, by means of a bind block 274.

The zeroing clutches 84 are of the friction type and electrically controllable. They are energized to engage their respective shafts 252 when the zeroing motor 80 starts to operate. Because each clutch 84 is capable of slipping relative to its shaft 252 it is possible to provide different initial settings for each of the controlled dimensions of the lamination and to vary the relative lengths of these dimensions as desired. Each of the three feed control mechanisms comes to rest as its adjustable stop nut 66 is cycled to zero; and the zeroing motor continues to operate until all zero settings are accomplished. The motor is stopped when a lug 276 on chain 82 comes into contact with the operating arm 278 of a micro-switch 280.

*Programmed Control System.*—The operating sequence of the various parts of the machine is programmed by an electrical control system shown schematically in FIGS.

17a and 17b. This system comprises a plurality of each of the following components: manually operated switches S1–7; machine operated switches (s), providing a steady contact when actuated, and (m), providing momentary contact; multi-contact relays A—T; pneumatic cylinder controlling solenoids; and, electric clutch control solenoids.

*Typical Control Combination.*—FIG. 16 shows, in diagrammatic form, a typical portion of this control system. A rack 282 is traversed between a forward or "operating" position and a withdrawn or "return" position by the piston 284 of a solenoid controlled pneumatic cylinder 286. The direction of thrust of the piston 284 is controlled by the location of the ports 287 and 288 of an air valve 290 which has an inlet line 292 for introducing air under sufficient pressure to move the piston 284 and two exhaust lines 294 and 296. The ports 287 and 288 are provided in a slidable member 298 which is connected between the armatures 300 and 302 of solenoid windings 304 and 306 respectively. Air lines 308 and 310 connect the valve 290 to the cylinder 286.

In this system, when solenoid winding 306 is energized and winding 304 de-energized, the slide 298 is pulled to the right hand side, as shown in FIG. 16, and air under pressure from the inlet 292 is applied, through the port 287 and line 308, to exert pressure against piston 284 and force rack 282 to the forward position shown in FIG. 16. A return for the air pressure system is provided from the cylinder 286 through the line 310 and port 288 to exhaust line 296.

The solenoid combination is so balanced that slide 298 connected to the armatures 300 and 302 will move only when one of the windings 304—306 is energized and the other de-energized. Thus, when winding 304 has been energized and winding 306 de-energized, the slide 298 will move to the left of the position shown in FIG. 16. Now, port 288 will connect the inlet line 292 to line 310 and port 287 will connect line 308 to the exhaust line 294. Thus, air under pressure coming through line 310 and exhausted out of the cylinder through line 308 will return the piston 284 within the cylinder and withdraw rack 282 in a return traverse.

A micro-switch 312 having an arm 314 is located proximate the rack 282, and a shoe 316 on the rack is adapted to engage the arm 314 and hold the contacts of switch 312 closed when the rack is in withdrawn position. This combination provides the s type steady contact switch shown in the schematic diagrams of FIGS. 17 and referred to above. The m momentary contact switches have a short trigger which will move an arm such as 314 only momentarily as the trigger is carried past the switch by the traverse of a rack such as 282.

The various components of the electrical system will now be described in more detail. During this description it should be remembered that the principal mechanical operations of the machine are performed or controlled by members (for the most part gear operated racks or mechanical slides) which are moved forward and backward, or up and down, in operating and return strokes or traverses. Thus, an operating stroke may be imparted to a rack such as 282 by energizing a solenoid winding such as 306; and, subsequently, before another operating stroke can be accomplished, a return stroke must be performed by de-energizing winding 306 and energizing the return solenoid winding 304.

*Power Supply.*—The power supply for the control system shown in FIGS. 17a and 17b includes a source 318 of A.C. potential, for operating the relays A—T and the solenoids which control the pneumatic cylinders, and a rectifier 320 which provides direct current potential for the electric increment clutches 70 and zero clutches 84.

Pilot lights 321 give visual indication when the various circuits of the system are energized.

*Manually Operated Switches.*—The main switch S–1 connects the A.C. power supply 318 to the control system.

Push button start switch S–2 energizes relay A to start an operating cycle.

Push button switch S–3 is employed for manual initiation of a single lamination producing machine cycle.

Manual-automatic switch S–4 converts the system between manual operation wherein single laminations are produced in response to actuation of switch S–3 and automatic operation where the machine continuously cycles through a series of laminations to produce a complete core and then automatically starts another core.

Push button switch S–5 permits fabrication of sufficient laminations for a single core only. Switches S–6 and S–7 are further manual-automatic controls, switch S–6 determining whether the power for starting succeeding lamination producing cycles will be constantly available from the Power Bus, or only when the Run and Manual Busses are energized.

Switch S–8 connects the take-up motor 118, which tensions the stock material feeding through the work station 38, to the Power Bus.

*Machine Operated Switches.*—Switches which have their contacts closed as long as the machine part which controls them remains in a given position have the prefix s. Those whose contacts close only momentarily as a machine part moves from one position to another have the prefix m.

Top cutter switch s–11 is actuated as the machine severs a completed lamination to energize: the lamination counter solenoid 320; the cutter and clamp return solenoids 322 and 324, respectively; the #3 feed return solenoid 326; and, relay T.

1 feed switch s–12 energizes relay C; #2 feed switch s–13 energizes relay D and, under control of contacts 0–4 of relay O, the #1 feed return solenoid 327; and #3 feed switch s–14, under control of contacts M–3 of relay M and P–2 of relay P, energizes relay E and, through contacts 0–6 of relay O, the #2 feed return solenoid 328. These three feed switches are located physically at the rear of the machine, and their contacts are closed when their respective increment control racks 62 strike stops 232.

Bottom bend switch s–15 energizes relay N and the bend return solenoid 329.

Zero switch s–16 is comprised by the contact points of switch 280. These points are closed when contact arm 278 of switch 280 is depressed by the dog or lug 276 on the zeroing chain 82 (see FIG. 11). This switch energizes relays O and P, thereby, in addition to other functions explained below, stopping the zeroing motor.

Bottom cutter switch m–11 energizes the #1 feed operating solenoid 320, and relay Q at the appropriate time during the zeroing cycle, as controlled by contacts P–3 of relay P, to energize the solenoid 332 which sets the lamination counter 333 and to de-energize the Zero Bus 342.

Top bend switch m–12 energizes the #2 and the #3 feed operating solenoids 334 and 336, respectively under control of contacts C–1 of relay C and D–1 of relay D.

*Relays.*—Relay A is energized by the push button start switch S–2, and locks in by the closing of its contacts A–1. It in turn energizes the Power Bus 338 by the closing of its contacts A–2; and by the opening of its contacts A–3, disconnects the cutter operating solenoid 340, the clamp operating solenoid 341, and relay T from Bus 338.

Relay B is energized by the series combination of contacts E–3 of relay E, which are closed when relay E is energized through the #3 feed switch s–14, and contacts T–3 of relay T which are closed when that relay is energized by the top cutter switch s–11. The function of relay B is to energize the Zero Bus 342 through the closing of its contacts B–3 under control of switch 343 operated by the lamination counter 333 and to de-energize the Run Bus 344 by opening its contacts B–3. When energized, it locks in by the closing of its contacts B–1.

Relay C is operated by the #1 feed switch s–12 to energize: by closing contacts C–1, the #2 feed operating solenoid 334, under control of top bend switch m–12; by closing contacts C–2, the bend operating solenoid 345, as controlled by contacts D–1 of relay D; and, by closing contacts C–3, the #1 increment operating solenoid 346 and the #3 increment return solenoid 348. It de-energizes bend operating solenoid 345, under control of contacts D–2 of relay D, by opening its contacts C–4.

Relay D is energized by the #2 feed switch s–13 to actuate: by closing contacts D–3, the #3 feed operating solenoid 336 under control of top bend switch m–12; by closing contacts D–2, the bend operating solenoid 345, under control of contacts C–4 of relay C; and, by closing contacts D–4, the #2 increment operating solenoid 350 and the #1 increment return solenoid 352. It de-energizes bend operating solenoid 345, under control of contacts C–2 of relay C, by opening its contacts D–2.

Relay E is energized by the #3 feed switch s–14 under control of contacts M–1 of relay M and P–1 of relay P, to actuate: by closing contacts E–3, relay B, under control of contacts T–3 of relay T; by closing contacts E–1, the cutter operating solenoid 340, under control of contacts T–2 of relay T; by closing contacts E–2, the #3 increment operating solenoid 354, and the #2 increment return solenoid 356.

Relay M is energized by the Zero Bus, through normally closed contacts 0–1 or relay O, to actuate: by closing contacts M–1, the #2 feed operating solenoid 334; by closing contacts M–2, the #3 feed operating solenoid 336; and by opening contacts M–3, to de-energize relay E and the #2 feed return solenoid 358, unless they are energized by an alternative circuit through contacts 0–3 of relay O.

Relay N is energized by the bottom bend switch s–15 to de-energize the bend operating solenoid 345, by opening contacts N–2, and under control of contacts C–2 and C–4 of relay C and D–1 and D–2 of relay D. It locks in by closing its contacts N–1.

Relay O is operated by contacts s–16 of the zero switch 280 and locks in by closing its contacts 0–1 to energize the #1 feed return solenoid 327 by closing contacts 0–2, and the #2 feed return solenoid 328 by closing contacts 0–3. It de-energizes relays M, R, and S, and zeroing motor 80 by opening contacts 0–4 and interrupts the parallel operation of relay E and the #2 feed return solenoid 328 by opening contacts 0–6.

Relay P is also energized by the closing of contacts s–16 of zero switch 280. It energizes, by closing contacts P–2 and under control of contacts T–1 of relay T: the #3 feed return solenoid 326; the cutter return solenoid 322, the clamp return solenoid 324; relay T; and, the counter solenoid 320. Also, in series combination with the bottom cutter switch m–11, its contacts P–3 provide a circuit to energize relay Q. It deenergizes relay E by opening its contacts P–1, and is locked in by the closing of contacts 0–1 of relay O which operates in parallel with it.

Relay Q is energized by the combination of bottom cutter switch m–11 and contacts P–3 of relay P to energize the counter set solenoid 332 by closing contacts Q–1.

Relay R is energized from the Zero Bus 342 through normally closed contacts 0–4 of relay O to de-energize: the #1 increment clutch solenoid 364 by opening contacts R–1; the #2 increment clutch solenoid 366 by opening contacts R–3; and, the #3 increment clutch solenoid 368 by opening contact R–5. It energizes: the #1 zero clutch solenoid 370 by closing contacts R–2; the #2 zero clutch solenoid 372 by closing contacts R–4; and the #3 zero clutch solenoid 374 by closing contacts R–6.

Relay S is also energized from the Zero Bus through normally closed contacts 0–4 of relay O to de-energize: the #1 increment clutch 364 by opening contacts S–1; the #2 increment clutch 366 by opening contacts S–3; and the #3 increment clutch 368 by opening contacts S–5

It energizes: the #1 zero clutch 370 by closing contacts S–2; the #2 zero clutch 372 by closing contacts S–4; and the #3 zero clutch 374 by closing contacts S–6.

Relay T is energized by the top cutter switch s–11. In combination with closed contacts E–1 of relay E or P–2 of relay P, it locks in through its contacts T–1 and energizes clamp return solenoid 324, cutter return solenoid 322, and #3 feed return solenoid 326. It also de-energizes cutter operating solenoid 340 and clamp operating solenoid 341 by opening contacts T–2, and in series combination with contacts E–3 of relay E, energizes relay B through contacts T–3.

*Solenoids.*—The following is a description of the programmed control system of FIGS. 17a and 17b from the viewpoint of the various solenoids which control the pneumatic cylinders, motors, clutches, etc. of the machine.

The #1 feed operating solenoid 330 is energized by the bottom cutter switch m–11 each time the cutter 46 is returned to its bottom position.

The #1 feed return solenoid 327 is energized by the closing of the contacts s–13 of the #2 feed switch each time this switch is closed at the end of a #2 feed stroke. It is also energized, through the contacts 0–2 of relay O, during the zeroing operation.

The #2 feed operating solenoid 334 is energized through the series combination of the contacts C–1 of relay C and the closing of the contacts m–12 of the top bend switch at the end of a bend operation. During the zeroing cycle this solenoid is operated through contacts M–1 of relay M.

The #2 feed return solenoid 328 is energized through contacts s–14 of the #3 feed switch, under control of contacts M–3 of relay M and P–1 of relay P, or through contacts 0–3 of relay O during the zeroing cycle.

The #3 feed operating solenoid 336 is energized through the contacts D–3 of relay D and contacts m–12 of the top bend switch which is actuated at the completion of a bending operation. During the zeroing cycle this solenoid is energized through the contacts M–2 of relay M. The #3 feed return solenoid 326 is energized by the appropriate setting of switches S–3, S–4, and S–6 and the closing of the contacts s–11 of the top cutter switch during each cutting or severing stroke.

The #1 increment operating solenoid is energized through contacts C–3 of relay C which is actuated by the closing of contacts s–12 of the #1 feed switch.

The #1 increment return solenoid 352 is energized by contacts D–4 of relay D actuated by the closing of the #2 feed switch contacts s–13.

The #2 increment operating solenoid 350 is energized in parallel with the #1 increment return solenoid.

The #2 increment return solenoid 356 is energized by the closing of contacts E–2 of relay E, operated by the closing of contacts s–14 of the #3 feed switch.

The #3 increment operating solenoid 354 is energized in parallel with the #2 increment return solenoid.

The #3 increment return solenoid 348 is energized in parallel with the #1 increment operating solenoid.

The cutter operating solenoid 340 is energized by the closing of the contacts E–1 of relay E when this relay has been actuated by the closing of the contacts s–14 of the #3 feed switch at the completion of a #3 feed stroke. It is also energized, during the initial set up of the machine by the closing of the main power switch S–1, and during the zeroing operation by the closing of contacts P–2 of relay P.

The cutter return solenoid 322 is operated in parallel with the #3 feed return solenoid.

The clamp operating and return solenoids 341 and 324 respectively, are energized in parallel with the corresponding cutter solenoids.

The bend operating solenoid 345 is energized through the contacts N–2 of relay N and the appropriate combination of contacts C-2 or C-4 of relay C and D-1 or D-2 of relay D which are operated by the #1 and #2 feed switches respectively.

The bend return solenoid 329 is operated by the bottom bend switch which closes its contacts s-15 at the completion of each bend operating stroke.

Counter setting solenoid 332 is energized through the closed contacts Q-1 of relay Q when this relay is energized by the closing of contacts P-3 of relay P during the zeroing cycle.

The impulse count solenoid 320 is energized in parallel with the #3 feed return solenoid.

The zeroing motor 80 is started when the Zero Bus 342 is energized through the closing of the contacts of switch 343 in the lamination counter 333. It is stopped through the opening of contacts 0-4 of relay O when the contacts s-16 of the zero switch 280 are closed by the action of lug 276 on the zeroing chain contacting the arm 278 of the switch 280.

The tension motor 118 is operated by appropriate setting of the switch S-8.

The #1 increment clutch solenoid 364 is de-energized so that the clutch disengages from shaft 68 when contacts R-1 and S-1 of relays R and S respectively are opened as contacts 0-4 of relay O break during the zeroing cycle. It is energized by the closing of contacts R-1 and S-1 when relays R and S are de-activated through the opening of contacts 0-4 of relay O when the Zero Bus 342 is de-energized at the end of the zeroing cycle.

The #2 increment clutch solenoid 366 is operated in parallel with the #1 increment clutch through relay contacts R-3 and S-3.

The #3 increment clutch solenoid 368 is similarly operated through relay contacts R-5 and S-5.

The #1 zero clutch solenoid 370 is energized so that this clutch engages its shaft 252 when contacts R-2 and S-2 of relays R and S are closed by the energizing of the Zero Bus 342. It is de-energized, and the clutch disengaged, when the contacts s-16 of switch 280 are closed at the end of the zeroing cycle to energize relay O and open the contacts 0-4 which control the current to relays R and S.

The #2 zero clutch solenoid 372 is operated in parallel with the #1 zero clutch solenoid through relay contacts R-4 and S-4.

The #3 zero clutch 374 is operated in parallel with the other two zero clutches through relay contacts R-6 and S-6.

DETAILED OPERATING CYCLE

The mechanism and circuitry hitherto described may be conditioned for automatic operation by: setting switches S-4, S-6, and S-7 to automatic position; setting the counter to the number of laminations desired for each core; adjusting the slide 266a associated with each feed, by referencing its scale 270 against its pointer 272, for the desired initial dimension of each side of the first lamination; and, adjusting each increment knob 244, by referencing its pointer 246 against the scale on its stud 248, to the desired incremental increase of each of these dimensions for successive laminations.

With these preliminary settings, when switches S-1 and S-2 are closed, the machine will first produce a preliminary scrap lamination, automatically cycle through the number of laminations set into the counter to provide for a first core, and automatically recycle for the laminations of succeeding cores.

Preliminary Scrap Lamination (1) Close switch S-1 manually.

(2) This energizes the cutter operating solenoid 340 and the clamp operating solenoid 341, through contacts A-3 and T-2 of relays A and T respectively which are both normally closed. It also causes the cutter blade 46 to close against the cutting edge 170 of die plate 40 and thereby trim the end of stock material 36 for a proper reference to begin a lamination.

(3) Push switch S-2 to contact position.

(4) This energizes relay A which locks in through closing contacts A-1.

(5) Closing contacts A-2 energize the Power Bus 338 and provide an input for the rectifier 320 of the D.C. supply.

(6) The Run Bus 344 is energized off the activated Power Bus 338 through the normally closed contacts B-2 of relay B.

(7) The top cutter switch s-11, since the cutter 46 is in the up or closed position, completes a circuit through switches S-4 and S-6 to connect the Power Bus 338 to the cutter and clamp return solenoids 322 and 324 respectively, the #3 feed return solenoid 326 and the count solenoid 320.

(8) It also energizes relay T which opens contacts T-2 to de-energize the cutter and clamp operating solenoid 340 and 341 respectively so that the cutter and clamp return solenoids 322 and 324 can be effective to return the cutter and the clamp respectively.

(9) The #1 feed operating solenoid 330 is energized off the Power Bus 338 by the momentary closing of the bottom cutter switch m-11 which is operated as the cutter returns.

This measures out the stock material for the first side of the lamination.

(10) Relay C is operated when the #1 feed switch s-12 is closed by the increment control rack 62 of the #1 feed completing its traverse and contacting its stop 232 to which this switch is connected.

(11) Contacts C-2 of relay C energize the bend operating solenoid 345 with power from the Bus 338 through normally closed contacts N-2 and D-1 or relays N and D respectively.

This provides the bend between the first and second sides of the lamination.

(12) The #1 increment operating solenoid 346 and the #3 increment return solenoid 348 are energized, through closing contacts C-3 of relay C, with power from the Run Bus 344.

(13) The bend return solenoid 329 and relay N are energized with power from Bus 338 by the closing of the bottom bend switch s-15 at the end of the stroke of the bend operating rack 140.

(14) Relay N locks in through: its contacts N-1; contacts C-2 of relay C, which are still held closed by the #1 feed switch s-12; and contacts D-2 of relay D which are normally closed. Contacts N-2 are opened so that the bend operating solenoid 345 is de-energized thereby permitting the bend return solenoid 329 to return the rack 140 to its original, i.e. returned, position.

(15) The #2 feed operating solenoid 334 is operated at the time of bend return by the closed contacts C-1 of relay C and the top bend switch m-12 connecting it to the Power Bus 338.

This measures out the material for the second side of the lamination.

(16) Relay D is operated by the increment control rack 62 of the #2 feed closing the contacts of switch s-13.

(17) The closing of switch s-13 also energizes the #1 feed return solenoid 327 through the normally closed contacts 0-4 of relay O.

(18) Relay N is de-energized when the normally closed contacts D-1 of relay D are opened.

(19) The #2 increment operating solenoid 350 and the #1 increment return solenoid 352 are energized off the Run Bus 344 by the closing of contacts D-4 of relay D.

(20) Relay C is de-energized when the switch s-12 is opened by the return of the #1 increment control rack 62.

(21) The bend operating solenoid 345 is energized by connection to the Bus 338 through the contacts C-4 of relay C, which have returned to normally closed position, and the closed contacts D-2 of relay D, This provides the bend between the second and third sides of the lamination.

(22) 13 repeats.

(23) 14 repeats, with contacts C–4 of relay C and D–2 of relay D co-acting with contacts N–1 to hold relay N.

(24) The #3 feed operating solenoid 336 is energized by the combination of closed contacts D–3 of relay D and top bend switch m–12 which connect it to the Power Bus 338.

This measures out the stock material for the third side of the lamination.

(25) Relay E is energized by the combination of normally closed contacts M–3 and P–1 of relays M and P, respectively, and the closing of the #3 feed switch s–14 when its increment rack 62 strikes the stop 232 connected to this switch, and the #2 feed return solenoid 328 is operated through this same circuit and the normally closed contacts 0–6 of relay O.

(26) The cutter and clamp operating solenoids 340 and 341, respectively, are energized by connection to the Power Bus 338 through the normally closed contacts T–2 of relay T and the closing of contacts E–1 of relay E.

This severs the completed lamination from the strip of stock material.

(27) The #3 increment operating solenoid 354 and the #2 increment return solenoid 356 are energized by connection to the Run Bus 344 through the closed contacts E–2 of relay E.

(28) 7 repeats, since the cutter has been closed by 26 above, and the contacts T–3 of relay T which has been energized by the closing of the top cutter switch s–11, in combination with the contacts E–3 of relay E energize relay B with power from the Bus 338.

(29) Relay B locks in through its contacts B–1.

(30) 9 repeats.

(31) The Run Bus 344 is de-energized by the opening of contacts B–2 of relay B.

(32) The Zero Bus 342 is energized by connection to the Power Bus 338 through the closed contacts B–3 of relay B and the normally closed contacts of switch 343 in the counter 333.

This starts the zeroing operation.

(33) The relays M, R, and S are energized and the zeroing motor 80 starts to operate, all by connection to the Zero Bus through the normally closed contacts 0–4 of relay O.

(34) The #2 feed operating solenoid 334 is energized by connection to the Power Bus 338 through the closed contacts M–1 of relay M.

(35) The #3 feed operating solenoid 336 is energized by similar connection to the Power Bus 338 through the closed contacts M–2 of relay M.

(36) Relay E is de-energized by the opening of contacts M–3 of relay M.

(37) The increment clutch solenoids 364, 366, and 368 are de-energized and the zero clutch solenoids 370, 372, and 374 are energized through reversal of condition by contacts R–1–6 and S–1–6 of relays R and S respectively.

(38) Relays O and P are energized by the closing of contacts s–16 of zero switch 280 when the zero chain 82 has brought dog 276 into contact with switch arm 278.

(39) Relays O and P lock in through the closing of contacts 0–1 of relay O which connect them to the Zero Bus.

(40) Relays M, R, and S are energized and the zeroing motor 80 is stopped by the opening of contacts 0–4 of relay O.

(41) The cutter operating solenoid 340 and clamp operating solenoid 341 are energized through the combination of the normally closed contacts T–2 of relay T and the closed contacts P–2 of relay P connecting them to Power Bus 338.

This provides a reference for the starting the first lamination in the new series starting with this zeroing operation.

(42) The #1 feed return solenoid 327 is energized by connection to the Power Bus 338 through the closing of contacts 0–2 of relay O. (The normally closed contacts 0–4 have been opened by the energized relay O so that no potential is applied at this time to energize relay D which otherwise operates in parallel with solenoid 327).

(43) The #2 feed return solenoid 328 is energized by connection, through the closed contacts 0–3 of relay O, to the Power Bus 338. (The opened contacts 0–6 of relay O prevent this connection from energizing relay E which would otherwise operate in parallel with solenoid 328).

*Subsequent Laminations*

(44) 7 repeats.

(45) 8 repeats.

(46) 9 repeats and relay Q is energized through the closed contacts P–3 of relay P, and the bottom cutter switch m–11 which connects it to the Power Bus 338.

(47) Relay Q locks in for the duration of the closing of the bottom cutter switch m–11 through closed contacts P–3 of relay P.

(48) The counter set solenoid 332 is energized by the closing of contacts Q–1 of relay Q which connects it to the Power Bus 338.

(49) Solenoid 332 is locked in, through the closing of contacts 378 when the solenoid 332 actuates the counter clutch.

(50) The Zero Bus 342 is de-energized by the opening of the normally closed contacts 343 by the energizing of solenoid 332.

This ends the zeroing operation.

(51) The Run Bus 344 is energized through connection to the Power Bus 338 by solenoid 332 closing switch contacts 380 in counter 333.

(52) 10 repeats, when the Run Bus 344 is energized as above.

(53) 11 repeats.

(54) 12 repeats.

(55) 13 repeats.

(56) 14 repeats.

(57) 15 repeats.

(58) 16 repeats.

(59) 17 repeats.

(60) 18 repeats

(61) 19 repeats.

(62) 20 repeats.

(63) 21 repeats.

(64) 13 repeats.

(65) 14 repeats.

(66) 24 repeats.

(67) 25 repeats.

(68) 26 repeats.

(69) 27 repeats.

(70) 7 repeats and the counter solenoid 320 subtracts 1 from the count set into the lamination counter.

This marks the end of the first lamination of the new series.

(71) 45–70 above repeats, etc.

When the counter has stepped down to 0 the number of laminations required for the core have been completed, and contacts 343 are closed to energize the Zero Bus 342 and repeat 32 and the following steps above.

The invention has been described as applied to the problem of providing an improved method of manufacturing laminated core inductors and a method and mechanism for measuring, bending and cutting strip metal stock in a manner particularly suited for efficient production of the series of units of incrementally varying dimensions which comprise the core of a transformer or other laminated core inductor.

The method of manufacturing inductors and the mechanism for fabricating the individual laminations of the cores, which have been illustrated and described, give promise of considerable manufacturing economy. Also, they make possible a greatly improved product line at reduced cost, since they provide the means for producing superior performance inductors to individual optimum design specifications, with a minimum of inventory, time, and special treatment overhead charges.

The descriptive embodiment has been concerned with inductors having cores comprised of matched bend C configurations. The invention, however, is not limited to the specific deails of the illustrative description, but encompasses other types of equipment and other core configurations and manufacturing techniques which will be apparent to those skilled in the art. For example, large and small bent C's can be used together to provide combinations such as

and, other configurations with more sides can be fabricated by increasing the number of independent feed control systems from the three shown and described for making a C. Also, techniques such as running additional strips of stock, double or side by side, for heavy laminations or to produce the material for more than one core portion at a time may be employed.

Thus, the invention is not limited to the specific features of the accompanying drawings and description but embraces the full scope of the following claims.

What is claimed is:

1. For fabricating a laminated core for an electromagnetic inductor, a method of manufacturing a [-shaped laminated member for a core assembly comprising the steps of: preparing a first three sided, [-shaped, laminate member by feeding a continuous strip of core material in a first series of first, second and third measured distances, bending said material in a substantially 90° angle in a given direction at the end of said first measured distance, bending said material in a substantially 90° angle in the same given direction at the end of said second measured distance to produce said [-shape, severing said twice bent member from said strip at the end of said third measured distance; preparing a second, similar, laminate member by feeding said material in a second series of first, second and third measured distances each altered from the corresponding measurement in said first series by an amount substantially equal to twice the thickness of said material for said second measured distance and equal to at least once the thickness of said material for said first and said third measured distances, similarly bending said material at the end of the first and second of said measured distances and severing it at the end of the third in said second series so that said second laminate will fit to said first laminate in a stacked array; preparing additional laminate members by similar feeding, measuring with progressive alteration in the same direction, bending and severing operations; and, stacking said laminations so prepared, one within the confines of another.

2. For fabricating an electromagnetic inductor, a method of manufacture comprising the steps of: providing an electric current conductor arranged in an open center toroid configuration; preparing a first three sided, [-shaped, laminate member for a laminated core by feeding a continuous strip of magnetic core material in a first series of first, second and third measured distances, bending said material in a substantially 90° angle in a given direction at the end of said first measured distance, bending said material in a substantially 90° angle in the same given direction at the end of said second measured distance to produce said [-shape, severing said twice bent member from said strip at the end of said third measured distance; preparing a second, similar, laminate member by feeding said material in a second series of first, second and third measured distances each altered from the corresponding measurement in said first series by an amount substantially equal to twice the thickness of said material for said second measured distance and equal to at least once the thickness of said material for said first and said third measured distances, similarly bending said material at the end of the first and second of said measured distances and severing it at the end of the third in said second series so that said second laminate will fit to said first laminate in a stacked array; preparing additional laminate members by similar feeding, measuring with progressive alteration in the same direction, bending and severing operations; stacking said laminations so prepared, one within the confines of another, to provide a [-shaped laminated core assembly; inserting one leg of said [ through said open center of said toroid-shaped conductor; and, closing the open side of said [ with core material to complete a laminated core inductor assembly.

3. For fabricating a laminated core electromagnetic inductor, a method of manufacture comprising the steps of: providing an electric current conductor arranged in an open center toroid configuration; preparing a first three sided, [-shaped, laminate member for a laminated core by feeding a continuous strip of core material in a first series of first, second and third measured distances, said first and third distances being of unequal length to produce a long and a short side, bending said material in a substantially 90° angle in a given direction at the end of said first measured distance, bending said material in a substantially 90° angle in the same given direction at the end of said second measured distance to produce said [-shape, severing said twice bent member from said strip at the end of said third measured distance; preparing a second, similar, laminate member by feeding said material in a second series of first, second and third measured distances each altered from the corresponding measurement in said first series by an amount substantially equal to twice the thickness of said material for said second measured distance and equal to at least once the thickness of said material for said first and said third measured distances, similarly bending said material at the end of the first and second of said measured distances and severing it at the end of the third in said second series so that said second laminate will fit to said first laminate in a stacked array; preparing additional laminate members by similar feeding, measuring with progressive alteration in the same direction, bending and severing operations; stacking said laminations so prepared, one within the confines of another with the long side of each member adjacent the short side of adjacent members, to provide a first [-shaped laminated core assembly wtih serrated edges; preparing a second [-shaped laminated core assembly with serrated edges in a similar manner; and, fitting the serrations of said first and second assemblies to each other, through said open center toroid-shaped conductor to thereby link said conductor by an □-shaped core.

4. A method of manufacturing an electromagnetic inductor having a multilegged laminated metal core with at least one leg encircled by one or more coils of wire, which includes the steps of: providing said coiled wire in a preformed configuration with an open center adapted to receive said encircled leg; preparing at least a portion of said core in two parts each being [-shaped and comprising a first arm, a base and a second arm, by first feeding a continuous strip of core material through a work station in a first measured amount equal to a desired length for said first arm in one of said laminations, bending said strip in substantially a 90° angle at the end of said first measured amount, second feeding said material through said station in a second measured amount equal to the length desired for the base of said one lamination, bending said strip in substantially a 90° angle at the end of said second measured amount in the same direction to produce said [-shape, third feeding said material through said station in a third measured amount equal to the length desired for the second arm of said one lamination, severing said bent portions from said continuous strip at the end of said third measured amount, similarly feeding and measuring, bending and severing said strip material at said station in a second and similar sequence of operations wherein the measured length of said first and second arms is changed by an amount substantially equal to one thickness of said material and the measured length of said base is changed in the same direction of increment or decrement as said change for said arms by an amount substantially equal to twice the thickness of said material to produce a second lamination of the proper size to fit to said first lamination in a nested stack, repeating said feeding, changing, measuring with progressive changes of corresponding dimensions in the same direction, bending and severing operations to provide the number of laminations desired for said first part of said core assembly; stacking said laminations into an assembly; fabricating said second part-core portion in a manner similar to that recited for fabrication of said first part-core portion; inserting a leg of said first part-core through said open center of said preformed winding; and, joining said second part-core to said first part-core.

5. A method of manufacturing an electromagnetic inductor having a multilegged laminated metal core with at least one leg encircled by one or more coils of wire, which method includes the steps of: providing said coiled wire in a preformed configuration with an open center adapted to receive said encircled leg; preparing at least a portion of said core in two part-core assemblies each being [-shaped and comprising a first arm, a base and a second arm, by first feeding a continuous strip of core material through a work station in a first measured amount equal to a desired length for said first arm in one of said laminations, bending said strip in substantially a 90° angle at the end of said first measured amount, second feeding said material through said station in a second measured amount equal to the length desired for the base of said lamination, bending said strip in substantially a 90° angle at the end of said second measured amount in the same direction to produce said [-shape, third feeding said material through said station in a third measured amount equal to the length desired for the second arm of said lamination, said third measured length being different from said first measured length, severing said bent portions from said continuous strip at the end of said third measured amount, similarly feeding and measuring, bending and severing said strip material at said station in a second and similar sequence of operations wherein the measured length of said first and second arms is changed by an amount substantially equal to one thickness of said material and the measured length of said base is changed in the same direction of increment or decrement as said change for said arms by an amount substantially equal to twice the thickness of said material to produce a second lamination of the proper size to fit to said first lamination in a nested stack, arranging said laminations in such a stack, turning said second lamination with respect to said first during said arranging so that said first arm of one lamination lies adjacent said second arm of said second lamination to thereby contribute to the formation of a serrated edge, and repeating said feeding, measuring with progressive changes of corresponding dimensions in the same direction, changing, bending, severing, arranging and turning operations to provide and stack the number of laminations desired for said first part-core assembly; forming said second part-core assembly in the same manner as said first assembly; and, joining leg portions of said two assemblies by fitting the serrated edges of one to complementary serrations of the other through said open center of said preformed winding.

6. For the manufacture of laminated cores for electromagnetic inductors having multilegged laminated metal cores, a method of fabricating a series of [-shaped laminations adapted to be fitted one within the confines of the other and each comprising a first arm, a base and a second arm, which includes the steps of: first feeding a continuous strip of core material through a work station in a first measured amount equal to a desired length for said first arm of one of said laminations; bending said strip in substantially a 90° angle at the end of said first measured amount; second feeding said material through said station in a second measured amount equal to the length desired for the base of said lamination; bending said strip in substantially a 90° angle at the end of said second measured amount in the same direction to produce said [-shape; third feeding said material through said station in a third measured amount equal to the length desired for the second arm of said lamination; severing said bent portions from said continuous strip at the end of said third measured amount; similarly feeding and measuring, bending and severing said strip material at said station in a second and similar sequence of operations wherein the measured length of said first and second arms is changed by an amount substantially equal to one thickness of said material and the measured length of said base is changed in the same direction of increment or decrement as said change for said arms by an amount substantially equal to twice the thickness of said material to produce a second lamination of the proper size to fit to said first lamiantion in a nested stack; and, repeating said feeding, changing, measuring with progressive changes of corresponding dimensions in the same direction, bending and severing operations to provide the number of laminations desired for said series.

7. A method of manufacturing a multilegged laminated core for electromagnetic inductors which includes the steps of preparing at least a portion of said core in two parts, each being [-shaped and comprising a first arm, a base and a second arm, by: first feeding a continuous strip of core material through a work station in a first measured amount equal to a desired length for said first arm of one of said laminations; bending said strip in substantially a 90° angle at the end of said first measured amount; second feeding said material through said station in a second measured amount equal to the length desired for the base of said lamination; bending said strip in substantially a 90° angle at the end of said second measured amount in the same direction to produce said [-shape; third feeding said material through said station in a third measured amount equal to the length desired for the second arm of said lamination; severing said bent portions from said continuous strip at the end of said third measured amount; similarly feeding and measuring, bending and severing said strip material at said station in a second and similar sequence of operations wherein the measured length of said first and second arms is changed by an amount substantially equal to one thickness of said material and the measured length of said base is changed in the same direction of increment or decrement as said change for said arms by an amount substantially equal to twice the thicknesses of said material to produce a second lamination of the proper size to fit to said first lamination in a nested stack; repeating said feeding, measuring with progressive changes of corresponding dimensions in the same direction, changing, bending and severing operations to provide the number of laminations desired for said first part of said core assembly; arranging said laminations in a nested stack; forming said second part of said core assembly in the same manner as said first part; and, joining said assemblies to provide said core portion.

References Cited in the file of this patent
UNITED STATES PATENTS

| 1,773,907 | Knowlton | Aug. 26, 1930 |
| 2,369,617 | Sommerville | Feb. 13, 1945 |

(Other references on following page)

UNITED STATES PATENTS

| | | |
|---|---|---|
| 2,456,457 | Sommerville | Dec. 14, 1948 |
| 2,467,867 | Sommerville | Apr. 19, 1949 |
| 2,548,624 | Sclater | Apr. 10, 1951 |
| 2,634,321 | Larkin | Apr. 7, 1953 |
| 2,702,936 | Hurt | Mar. 1, 1955 |
| 2,749,981 | MacKinnon et al. | June 12, 1956 |
| 2,852,059 | Burman | Sept. 16, 1958 |
| 3,008,222 | Steinmayer | Nov. 14, 1961 |

FOREIGN PATENTS

| | | |
|---|---|---|
| 646,859 | Great Britain | Nov. 29, 1950 |